US012585206B2

(12) United States Patent
Kihara et al.

(10) Patent No.: US 12,585,206 B2
(45) Date of Patent: Mar. 24, 2026

(54) ELECTROPHOTOGRAPHIC PHOTORECEPTOR AND IMAGE FORMING DEVICE EQUIPPED THEREWITH, AND METHOD FOR PRODUCING ELECTROPHOTOGRAPHIC PHOTORECEPTOR AND CHARGE TRANSPORTING LAYER COATING LIQUID USED THEREFOR

(71) Applicant: SHARP KABUSHIKI KAISHA, Sakai City (JP)

(72) Inventors: Akiko Kihara, Sakai City (JP); Kohichi Toriyama, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 633 days.

(21) Appl. No.: 17/893,460

(22) Filed: Aug. 23, 2022

(65) Prior Publication Data

US 2023/0092971 A1 Mar. 23, 2023

(30) Foreign Application Priority Data

Sep. 16, 2021 (JP) ................................ 2021-151371

(51) Int. Cl.
*G03G 5/047* (2006.01)
*G03G 5/05* (2006.01)
*G03G 5/06* (2006.01)

(52) U.S. Cl.
CPC .......... *G03G 5/047* (2013.01); *G03G 5/0564* (2013.01); *G03G 5/06142* (2020.05)

(58) Field of Classification Search
CPC ... G03G 5/047; G03G 5/06142; G03G 5/0564
See application file for complete search history.

(56) References Cited

U.S. PATENT DOCUMENTS

2015/0355560 A1* 12/2015 Konishi ........... G03G 5/061473 430/59.5
2017/0090312 A1* 3/2017 Hirakata .............. G03G 5/0696
2023/0055856 A1 2/2023 Sekiya et al.

FOREIGN PATENT DOCUMENTS

JP H09-211873 A 8/1997
JP 2001-066800 A 3/2001
JP 2004-004454 A 1/2004
JP 2004034364 A * 2/2004
JP 2004219922 A * 8/2004
JP 2009-025506 A 2/2009
(Continued)

OTHER PUBLICATIONS

English machine translation of the description of JP-2004219922-A (Year: 2004).*
(Continued)

*Primary Examiner* — Mark F. Huff
*Assistant Examiner* — Boone Alexander Evans
(74) *Attorney, Agent, or Firm* — ScienBiziP, P.C.

(57) ABSTRACT

This electrophotographic photoreceptor includes at least a laminated photoreceptive layer, in which a charge generating layer and a charge transporting layer are laminated in this order on a conductive base. The charge transporting layer contains at least a charge transporting substance, a binder resin, and silica particles, and contains 0.1 ppm or more and 20 ppm or less of Na element and/or 0.01 ppm or more and 10 ppm or less of K element.

13 Claims, 2 Drawing Sheets

(56) References Cited

FOREIGN PATENT DOCUMENTS

| | | | |
|---|---|---|---|
| JP | 2015-210282 | A | 11/2015 |
| JP | 2023-024116 | A | 2/2023 |

OTHER PUBLICATIONS

English machine translation of the description of JP-2004034364-A (Year: 2004).*

* cited by examiner

ELECTROPHOTOGRAPHIC PHOTORECEPTOR AND IMAGE FORMING DEVICE EQUIPPED THEREWITH, AND METHOD FOR PRODUCING ELECTROPHOTOGRAPHIC PHOTORECEPTOR AND CHARGE TRANSPORTING LAYER COATING LIQUID USED THEREFOR

BACKGROUND OF THE INVENTION

Field of the Invention

The present disclosure relates to an electrophotographic photoreceptor and an image forming device equipped therewith, and a method for producing an electrophotographic photoreceptor and a charge transporting layer coating liquid used therefor. More specifically, the present disclosure relates to an electrophotographic photoreceptor that has excellent printing durability, high mechanical strength, and does not cause unevenness in image shading, an image forming device equipped therewith, a method of producing an electrophotographic photoreceptor, and a charge transporting layer coating liquid used therefor.

Description of the Background Art

Recently, an organic photoreceptor (herein also referred to as "electrophotographic photoreceptor", or simply "photoreceptor") that employs an organic photoreceptive material has been widely used as an electrophotographic photoreceptor.

However, because of the properties of organic materials, organic photoreceptors have the disadvantage of being easily worn from the surface by a cleaning blade or the like sliding in the proximity of the photoreceptor. Meanwhile, because of the increased use of contact charging systems using roller charging, and the extended life, miniaturization, and acceleration of electrophotographic devices such as digital copiers and printers in recent years, organic photoreceptors are exposed to even more severe environments that more easily cause wearing of the surface.

Therefore, as a way of overcoming the disadvantage described above, efforts have been made so far to improve the mechanical properties (wear resistance and printing durability) of the material surface of the photoreceptor.

Specifically, the addition of inorganic microparticles (also simply referred to as "inorganic particles") such as silica or alumina as a filler to the outermost surface layer of the photoreceptor has been investigated. Furthermore, the formation of a curable protective layer (also referred to as "surface protective layer") on a charge transporting layer, and the addition inorganic microparticles such as silica particles as a filler to the outermost surface layer has also been investigated.

In addition, disclosed in the prior art is a method of producing a coating liquid for producing an electrophotographic photoreceptor, which is formed by dispersing pigment particles for the electrophotographic photoreceptor and a binder in a solvent. Here, the dispersion medium for dispersing the pigment particles for the electrophotographic photoreceptor is one type of dispersion medium selected from soda glass beads, low alkaline glass beads, and zirconia beads containing yttrium. Also disclosed in the prior art is an electrophotographic photoreceptor having a charge generating layer formed using this coating liquid.

However, with the prior art described above, there is difficulty in achieving both an improvement in the wear resistance of the photoreceptor surface and stable image characteristics over a long period of time. Therefore, an object of the present disclosure is to provide an electrophotographic photoreceptor that has excellent printing durability, high mechanical strength, and does not cause unevenness in image shading, an image forming device equipped therewith, a method of producing an electrophotographic photoreceptor, and a charge transporting layer coating liquid used therefor.

SUMMARY OF THE INVENTION

As a result of diligent research to solve the above problems, the present inventors have found that a photoreceptor comprising at least a laminated photoreceptive layer having a charge generating layer and a charge transporting layer laminated in this order on a conductive base, in which the charge transporting layer contains a specific amount of Na element and/or K element, has silica particles in a well-dispersed state in the charge transporting layer such that the above problems can be solved. The present inventors thus have completed the present disclosure.

Thus, the present disclosure provides an electrophotographic photoreceptor including at least a laminated photoreceptive layer, in which a charge generating layer and a charge transporting layer are laminated in this order on a conductive base, wherein the charge transporting layer contains at least a charge transporting substance, a binder resin, and silica particles, and contains 0.1 ppm or more and 20 ppm or less of Na element and/or 0.01 ppm or more and 10 ppm or less of K element.

Furthermore, the present disclosure provides an image forming device at least comprising: the electrophotographic photoreceptor described above; a charger that charges the electrophotographic photoreceptor; an exposer that exposes the charged electrophotographic photoreceptor to form an electrostatic latent image; a developer that develops the electrostatic latent image formed by an exposure to form a toner image; a transferer that transfers the toner image formed by a development onto a recording medium; a fuser that fuses the transferred toner image on the recording medium to form an image; a cleaner that removes and recovers toner remaining on the electrophotographic photoreceptor; and a charge eliminator that eliminates surface charges remaining on the electrophotographic photoreceptor.

Also, the present disclosure provides a method of producing an electrophotographic photoreceptor including: forming a charge transporting layer using a charge transporting layer coating liquid containing at least a charge transporting substance, a binder resin, and silica particles, and containing 0.1 ppm or more and 20 ppm or less of Na element and/or 0.01 ppm or more and 10 ppm or less of K element with respect to a solid content.

Moreover, the present disclosure provides a charge transporting layer coating liquid used in the method of producing an electrophotographic photoreceptor described above, containing at least a charge transporting substance, a binder resin, and silica particles, and containing 0.1 ppm or more and 20 ppm or less of Na element and/or 0.01 ppm or more and 10 ppm or less of K element with respect to a solid content.

According to the present disclosure, it is possible to provide an electrophotographic photoreceptor that has excellent printing durability, high mechanical strength, and does not cause unevenness in image shading, and an image forming device equipped therewith.

DESCRIPTION OF THE PREFERRED EMBODIMENTS

A photoreceptor of the present disclosure realizes both an improvement in the wear resistance of the photoreceptor surface and stable image characteristics over a long period of time, which were difficult to achieve with the prior art.

That is, in the prior art, when non-uniformity of the dispersibility of the inorganic fine particles increases in the outermost surface layer of the photoreceptor, the mechanical strength differs between a portion in which inorganic fine particles are localized and a portion containing the binder resin during the repeated scraping of the residual toner by a cleaning blade. Consequently, there is a problem that, over the course of repeated image formation, the surface roughness of the photoreceptor gradually increases, and the load on some sections of the cleaning blade increases and contributes to breakages. Furthermore, there is a problem that stable image characteristics cannot be obtained over a long period of time due to the occurrence of color unevenness in the image caused by uneven wear of the outermost surface layer.

Figure 4:
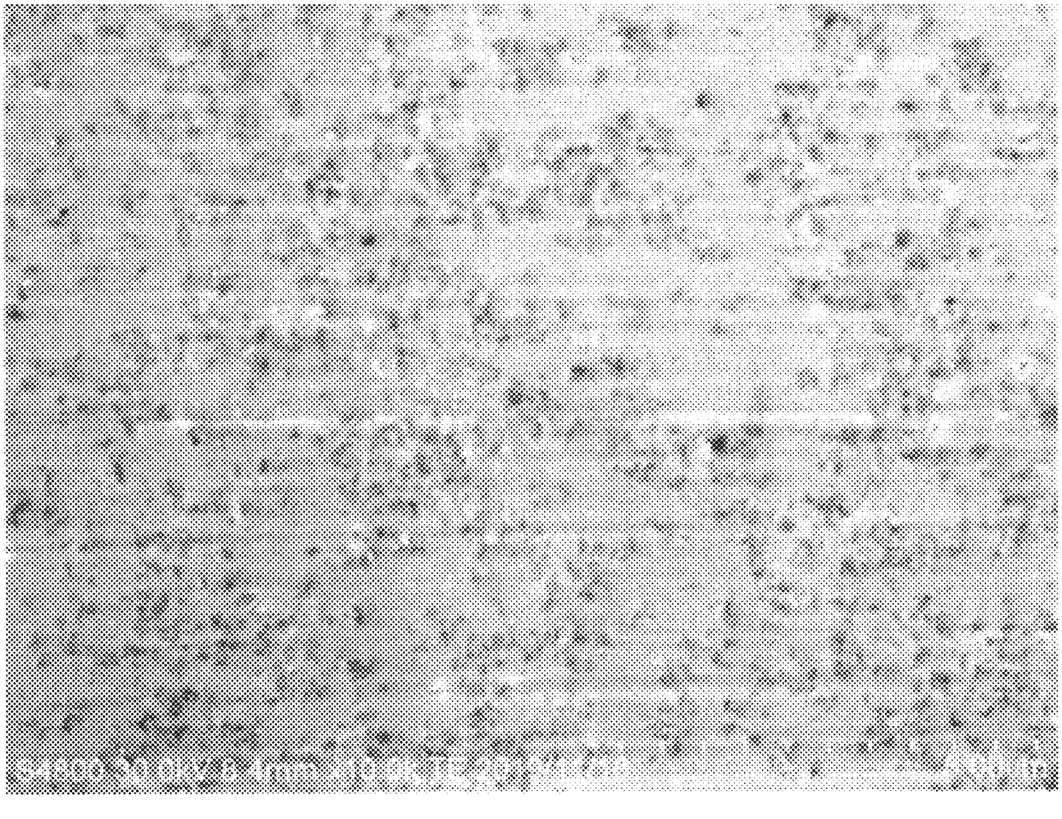
FIG. 4 is a scanning transmission electron microscope image showing a dispersed state of silica particles on the surface of a charge transporting layer of a photoreceptor of the present disclosure.

A photoreceptor of the present disclosure solves the above problems. That is, in the photoreceptor of the present disclosure, as shown in FIG. 4, the formation of agglomerates of silica particles added to the charge transporting layer, which is the outermost surface layer, in order to improve the printing durability of the photoreceptor, is suppressed. Consequently, the silica particles are uniformly dispersed in the charge transporting layer so as to form a loosely aggregated structure of "islands" (black portions in the diagram) in a uniform mesh-like structure, in which the silica particles are interconnected in a "sea" of the binder resin (white portions in the diagram). This is thought to enable the superior effects of the present disclosure described above to be exhibited.

In other words, as a result of the photoreceptor having the above configuration, variations in the mechanical strength of the charge transporting layer, which is the outermost surface layer, are eliminated. This is thought result in a uniform load on the blade and inhibit the progress of abrasive wear, which significantly improves the printing durability compared to conventional photoreceptors, and enables a photoreceptor to be provided that resolves the problem of partial breakage of the cleaning blade.

In order to optimize the dispersibility of the silica particles in the coating liquid for forming the constituent layers of the photoreceptor, the present inventors made a series of diligent studies and found that the dispersibility and uniformity of silica particles in the formed layers is improved by bringing the coating liquid mixture into contact with a soda-lime glass material during the preparation step of the coating liquid. Further, upon testing glass materials other than soda-lime glass (borosilicate glass and quartz glass) and metallic materials with respect to the dispersibility and effect of silica in the coating liquid, it was found that the same effect could not be obtained.

After further intensive study, it was found that the mechanical strength of soda-lime glass materials is weaker than that of other materials, resulting in gradual wear of the soda-lime glass material upon making contact with the nanoparticle-sized silica particles, causing a small amount of abrasion powder to become mixed with the coating liquid.

Further, because soda-lime glass materials contain metal oxides with high contact chargeability such as sodium oxide, potassium oxide, calcium oxide, magnesium oxide and aluminum oxide as constituents, the present inventors performed further studies based on the hypothesis that the silica particles in the coating liquid become charged as a result of the coating liquid containing the abrasion powder of these metal oxides, thereby causing the abrasion powder to adsorb to the surface of the silica particles and chemically modify the surface of the silica particles, resulting in an improvement in the dispersibility of the silica particles in the coating liquid. As a result, it was found that among the constituents of the soda-lime glass, sodium oxide and potassium oxide, which are present in the highest content after silicon oxide, are included in the abrasion powder in a larger amount than the other elements.

Therefore, upon analyzing the abrasion powder mixed in the coating liquid and examining the physical properties of the coating liquid, it was found that the sodium component and the potassium component, which have a high metal oxide contact chargeability, greatly contribute to the dispersion stability of the silica particles, thus completing the present disclosure.

The present inventors consider the improvement in dispersibility to be due to the large difference in electronegativity between oxygen and sodium or potassium, which causes a repulsive force to act between the silica particles due to contact and adsorption on the surface of the silica particles.

(1) Electrophotographic Photoreceptor

A photoreceptor of the present disclosure comprises at least a laminated photoreceptive layer, in which a charge generating layer and a charge transporting layer are laminated in this order on a conductive base, wherein the charge transporting layer contains at least a charge transporting substance, a binder resin, and silica particles, and contains 0.1 ppm or more and 20 ppm or less of Na element and/or 0.01 ppm or more and 10 ppm or less of K element.

First, the specific elements contained in the charge transporting layer (Na element and K element, and Ca element and Mg element described later), and the silica particles and the content ratio between the specific elements and the silica particles will be described. Then, each component of the photoreceptor, (2) an image forming device, (3) a method of producing an electrophotographic photoreceptor, and (4) a charge transporting layer coating liquid using the same, will be described.

Na Element and K Element

In the photoreceptor of the present disclosure, the charge transporting layer contains 0.1 ppm or more and 20 ppm or less of Na element and/or 0.01 ppm or more and 10 ppm or less of K element.

When the content of Na element is less than 0.1 ppm and the content of K element is less than 0.01 ppm, almost no contribution to the dispersion stability of the silica particles can be obtained. On the other hand, when the content of Na element exceeds 20 ppm or the content of K element exceeds 10 ppm, a satisfactory dispersibility of the silica particles is obtained. However, when charges are transported in the surface layer, an abrasion component results in charge trap sites that hinder charge transfer, which may lead to a deterioration in sensitivity.

The content of Na element is preferably 0.1 ppm or more and 10 ppm or less, and particularly preferably 0.1 ppm or more and 1.5 ppm or less. Furthermore, the content of K element is preferably 0.01 ppm or more and 2 ppm or less, and particularly preferably 0.01 ppm or more and 0.5 ppm or less.

The content of Na element and K element, and Ca element and Mg element described later can be measured, for example, using an ICP emission spectroscopic analyzer (model: iCAP-6500, manufactured by Thermo Fisher Scientific Co., Ltd.) with respect to the charge transporting layer of the photoreceptor.

Ca Element and Mg Element

The charge transporting layer contains 0.01 ppm or more and 10 ppm or less of Ca element and/or 0.01 ppm or more and 8 ppm or less of Mg element. Although Ca and Mg have an inferior electronegativity difference with oxygen compared to Na and K, they provide an effect on the dispersion stability of the silica particles.

When the content of Ca element or Mg element is less than 0.01 ppm, almost no contribution to the dispersion stability of the silica particles can be obtained. On the other hand, when the content of Ca element exceeds 10 ppm or the content of Mg element exceeds 8 ppm, a satisfactory dispersibility of the silica particles is obtained. However, when charges are transported in the surface layer, an abrasion component results in charge trap sites that hinder charge transfer, which may lead to a deterioration in sensitivity.

The content of Ca element is preferably 0.01 ppm or more and 1 ppm or less, and particularly preferably 0.01 ppm or more and 0.2 ppm or less. Furthermore, the content of Mg element is preferably 0.01 ppm or more and 0.8 ppm or less, and particularly preferably 0.01 ppm or more and 0.2 ppm or less.

Ratio of Silica Particles to Na Element

The mass ratio [Na/SF] of the content of Na element [Na] to the content of silica particles [SF] in the charge transporting layer is preferably $8\times10^{-6}$ or more and $2\times10^{-5}$ or less.

Below the lower limit of the content ratio, the effect of improving the dispersibility of silica provided by the abrasion powder of each element is not obtained, and the ten-point surface roughness Rz of the photoreceptor becomes larger. This increases the load on the contacting member, which can sometimes cause problems such as chipping of the blade. On the other hand, above the upper limit of the content ratio, although the dispersibility of silica increases and the ten-point surface roughness Rz of the photoreceptor becomes smaller, the number of hole transport trap sites in the photoreceptive layer increases, which may have adverse effects on the long-term image characteristics such as an increase in the residual potential and a deterioration in the sensitivity.

The mass ratio [Na/SF] is preferably $1\times10^{-5}$ or more and $2\times10^{-5}$ or less, and particularly preferably $1\times10^{-5}$ or more and $1.7\times10^{-5}$ or less.

Ratio Between Silica Particles and Ca Element

The mass ratio [Ca/SF] of the content of Ca element [Ca] to the content of silica particles [SF] in the charge transporting layer is preferably $1\times10^{-7}$ or more and $1\times10^{-6}$ or less.

Below the lower limit of the content ratio, the effect of improving the dispersibility of silica provided by the abrasion powder of each element is not obtained, and the ten-point surface roughness Rz of the photoreceptor becomes larger. This increases the load on the contacting member, which can sometimes cause problems such as chipping of the blade. On the other hand, above the upper limit of the content ratio, although the dispersibility of silica increases and the ten-point surface roughness Rz of the photoreceptor becomes smaller, the number of hole transport trap sites in the photoreceptive layer increases, which may have adverse effects on the long-term image characteristics such as an increase in the residual potential and a deterioration in the sensitivity.

The mass ratio [Ca/SF] is preferably $1\times10^{-7}$ or more and $5\times10^{-7}$ or less, and particularly preferably $1\times10^{-7}$ or more and $2\times10^{-7}$ or less.

Silica Particles

The photoreceptor of the present disclosure contains silica (silicon dioxide: $SiO_2$) particles as a filler in the charge transporting layer, which is the outermost surface layer.

The silica particles preferably used in the present disclosure are not limited to those derived from a manufacturing method, and examples include dry silica particles such as fumed silica derived by burning silicon tetrachloride, or arc silica derived by forming silica into microparticles in a vapor phase with high energy such as plasma; wet silica particles such as precipitated silica derived by synthesis from an aqueous sodium silicate solution as a raw material in an alkaline condition, and gelled silica derived by synthesis in an acid condition; colloidal silica particles derived by alkalifying and polymerizing acidic silicate; and sol-gel silica particles derived by hydrolysis of an organic silane compound.

Number Average Primary Particle Size of Silica Particles

The silica particles preferably have a number average primary particle size of 10 nm or more and 30 nm or less.

When the number average primary particle size of the silica particles is less than 10 nm, a sufficient printing durability may fail to be provided. On the other hand, when the number average primary particle size of the silica particles is more than 30 nm, a larger agglomeration structure may be generated in the photoreceptive layer, thus being likely to cause problems such as cleaning defects.

The number average primary particle size of the inorganic compound microparticles is preferably 15 nm or more and 30 nm or less.

The number average primary particle size can be calculated as a Feret's direction average diameter by magnifying the silica particles using a scanning electron microscope observation at a magnification between 30,000 to 300,000 times, such as a magnification of 100,000 times, randomly observing 100 particles as primary particles, and then performing image analysis.

Silica Particle Content

The content of silica particles as a filler is preferably 7% by mass or more and 18% by mass or less of the charge transporting layer, which is the outermost surface layer of the photoreceptor, and the silica particles are preferably uniformly dispersed.

When the content of the silica particles is less than 7% by mass, an effect on the wear resistance may not be sufficiently provided. On the other hand, when the content of the inorganic compound microparticles is more than 25% by mass, the dispersibility may not be sufficient and agglomeration may increase, thus resulting in deteriorated cleaning characteristics. The content of the inorganic compound microparticles is preferably 7% by mass or more and 15% by mass or less in the outermost surface layer, and is particularly preferably 8% by mass or more and 13% by mass or less.

Surface Treatment of Inorganic Compound Microparticles

In order to improve the electrical properties of the photoreceptor, the silica particles are preferably surface-treated with a surface treatment agent. When the inorganic compound microparticles are silica particles, examples of surface treatment agents thereof include hexamethyldisilazane, N-methyl-hexamethyldisilazane, N-ethyl-hexamethyldisilazane, hexamethyl-N-propyldisilazane, dimethyldichlorosilane, and polydimethylsiloxane. Among these surface treatment agents, dimethyldichlorosilane and hexamethyldisilazane are particularly preferable, because they have good reactivity with the hydroxyl group on the silica particle surface, reduce the number of hydroxyl groups on the silica particle surface, and consequently enable suppression of reduction in the electrical properties of the photoreceptor due to water (humidity).

The present disclosure can employ silica particles obtained by treatment with the surface treatment agent described above, but can also use commercially-available silica microparticles treated with a surface treatment agent. Examples of the commercially-available silica microparticles include products named R972, R974, RX50, RX200, NX130, NX90 G, NX90S, and NAX-50, manufactured by Nippon Aerosil Co., Ltd.; products named TS610, TG709F, and TG6110 G, manufactured by Cabot Japan K. K.; and a product named YA010C, manufactured Admatechs Co., Ltd.

Surface Roughness of Charge Transporting Layer Rz

The charge transporting layer of the photoreceptor of the present disclosure preferably has a ten-point surface roughness Rz of 0.1 μm or more and 1.0 μm or less as defined by JIS-B-0601 (1994).

This is achieved by inorganic compound microparticles with a small particle diameter agglomerating appropriately and uniformly. In general, a larger particle diameter of the inorganic compound microparticles increases wear resistance, but causes chipping of the edge part of the cleaning blade. In the present disclosure, the small inorganic compound microparticles are appropriately agglomerated, thereby creating large particles to improve wear resistance, and in terms of chipping of the cleaning blade, partial breakage is less likely to occur due to the detachment of small particles.

The surface roughness Rz is an indicator of the state of agglomeration caused by the silica particles on the charge transporting layer of the photoreceptor. The ten-point mean roughness Rz as defined by JIS-B-0601 (1994) represents a value represented in μm that indicates, in a part corresponding to a standard length extracted from a cross-sectional curve of the outermost surface layer of the photoreceptor, the difference between the mean value of the elevations of the first to fifth highest peaks measured in a direction perpendicular to the mean line, and the mean value of the depths of the first to fifth deepest valley bottoms, from a straight line parallel to the mean line and not intersecting the cross-sectional curve. The measurement method thereof will be described in the Examples.

When the surface roughness Rz is less than 0.1 μm, the interaction between the silica particles is not sufficient and it is difficult to obtain an effect on the wear resistance. On the other hand, when the surface roughness Rz exceeds 1.0 μm, agglomeration of the silica particles may be too large, thus being likely to cause a portion of the edge part of the cleaning blade to become chipped, failing to provide sufficient cleaning of residual toner and producing streak-like defects in the printed image.

The surface roughness Rz is preferably 0.2 μm or more and 0.5 μm or less, and particularly preferably 0.2 μm or more and 0.35 μm or less.

Photoreceptor

The photoreceptor of the present disclosure includes at least a laminated photoreceptive layer, in which a charge generating layer and a charge transporting layer are laminated in this order on a conductive base, wherein the charge transporting layer contains at least a charge transporting substance, a binder resin, and silica particles.

The outermost surface layer is the charge transporting layer constituting the laminated photoreceptive layer. The charge transporting layer may have one layer, or may have two layers, in which a first charge transporting layer and a second charge transporting layer are laminated in this order on the charge generating layer. In the case of two layers, it is preferable that the first charge transporting layer contains a charge transporting substance and a binder resin, and the second charge transporting layer, which is the outermost surface layer, contains a charge transporting substance, a binder resin, and silica particles.

With use of the drawings, description will now be made for the photoreceptor according to an embodiment of the present disclosure, in which the outermost surface layer is a charge transporting layer, but the present disclosure is not limited thereto.

Figure 1:
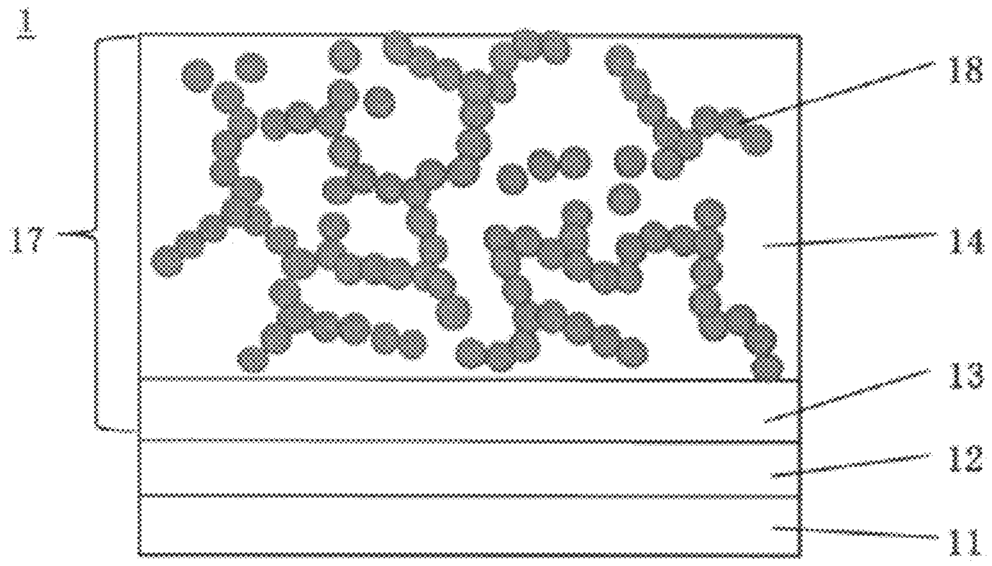
FIG. 1 is a schematic cross-sectional view illustrating a configuration of a main part of a photoreceptor 1 according to the present disclosure.

FIG. 1 is a schematic cross-sectional view illustrating a configuration of a main part of a photoreceptor 1 according to the present disclosure.

The photoreceptor 1 is a laminated photoreceptor (also referred to as "separated-function photoreceptor") that has an undercoat layer 12 provided on a conductive base 11, and further has thereon a laminated photoreceptive layer (also referred to as "separated-function laminated photoreceptor layer") 17 formed having a laminated structure, in which a charge generating layer 13 containing a charge generating substance (not shown), and a charge transporting layer 14 containing a charge transporting substance (not shown), a binder resin (not shown) that binds the substance together, and silica particles 18, are laminated in this order.

Figure 2:
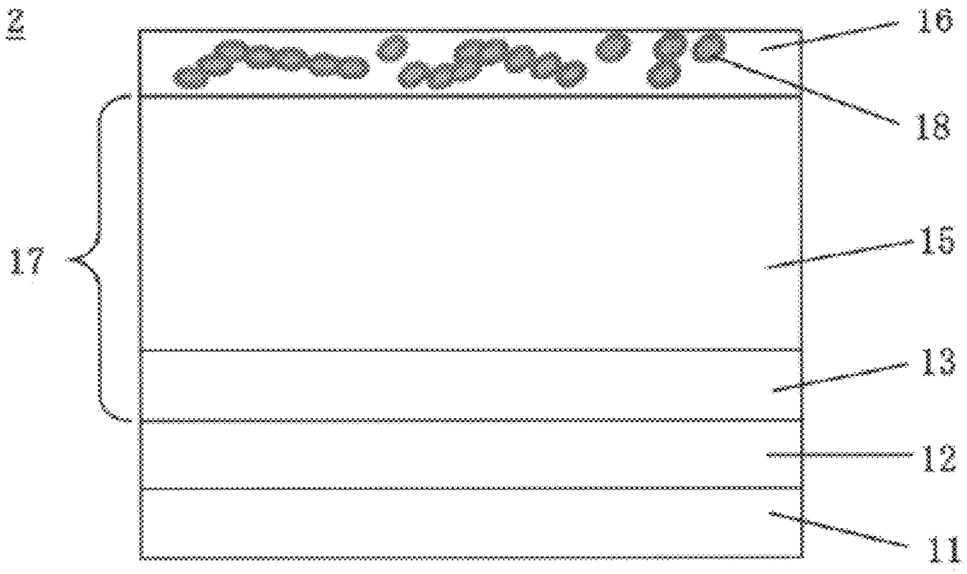
FIG. 2 is a schematic cross-sectional view illustrating a configuration of a main part of a photoreceptor 2 according to the present disclosure.

FIG. 2 is a schematic cross-sectional view illustrating a configuration of a main part of a photoreceptor 2 according to the present disclosure. In the photoreceptor 2, the one-layered charge transporting layer 14 of the photoreceptor 1 consists of two layers, in which a first charge transporting layer 15 and a second charge transporting layer 16 are laminated in this order on the charge generating layer. Other than the inclusion of silica particles 18 in the second charge transporting layer 16, the configuration is the same as that of the photoreceptor 1.

Hereinafter, each constituent of the photoreceptor 1 will be described.

Conductive Base 11

The conductive base functions both as an electrode of the photoreceptor and as a supporting member. The constituent materials of the conductive base are not particularly limited as long as the materials are used in the art. Specifically, examples of the constituent materials include metallic materials such as aluminum, aluminum alloy, copper, zinc, stainless steel, and titanium; and polymer materials such as polyethylene terephthalate, nylon, and polystyrene having a surface treated with metallic foil lamination, metallic vapor deposition, or vapor deposition or coating of a layer of a conductive compound such as a conductive polymer, tin oxide, and indium oxide; hard paper; and glass. Among these materials, aluminum is preferable from the viewpoint of ease of processing, and aluminum alloys such as JIS3003 series, JIS5000 series, and JIS6000 series are particularly preferable.

Figure 3:
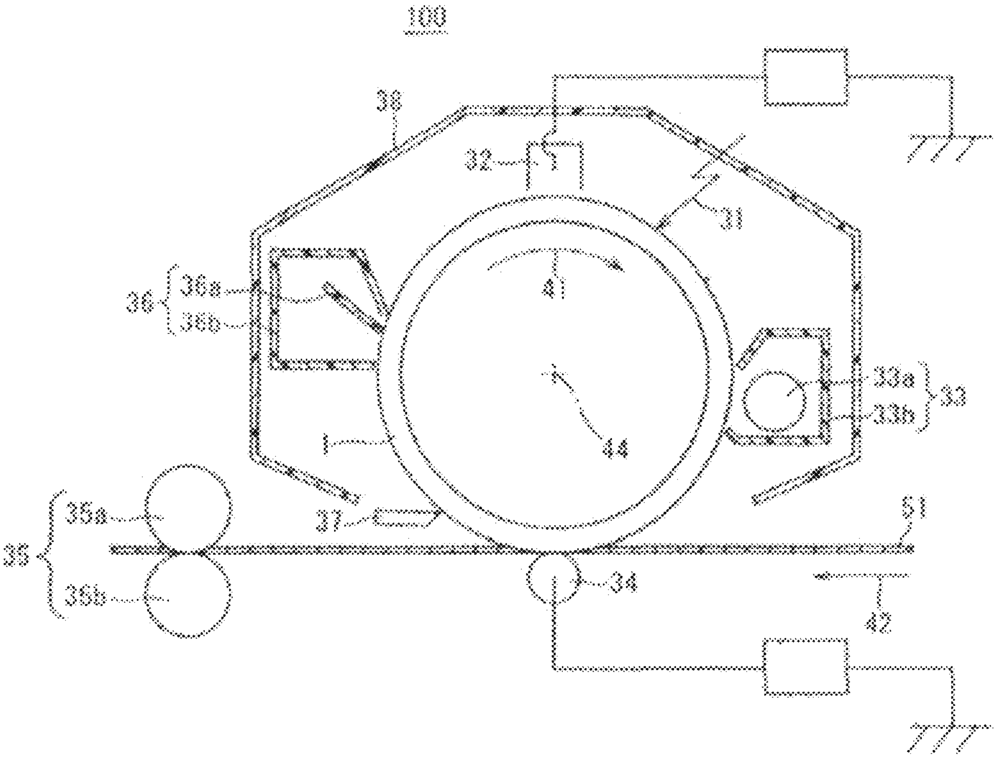
FIG. 3 is a schematic side view illustrating a configuration of a main part of an image forming device according to the present disclosure.

The shape of the conductive base is not limited to the cylindrical shape (drum shape) illustrated in FIG. 3, and may be a sheet shape, a columnar shape, an endless belt shape, or the like.

In addition, as necessary, a surface of the conductive base may be treated with anodic oxidation coating, surface treatment with chemicals or hot water, coloring, or irregular reflection treatment such as surface roughening without affecting an image quality, for the purpose of preventing interference fringes due to laser beam.

Undercoat Layer (or "Intermediate Layer") 12

The photoreceptor of the present disclosure preferably includes an undercoat layer 12 between the conductive base 11 and the laminated photoreceptive layer 17.

The undercoat layer generally coats the projections and cavities on the surface of the conductive base to provide evenness, increases the film formation properties of the laminated photoreceptive layer, which is the charge generating layer in this case, suppresses detachment of the laminated photoreceptive layer from the conductive base, and improves the adhesion between the conductive base and the laminated photoreceptive layer. Specifically, it is possible to prevent injection of charges from the conductive base to the laminated photoreceptive layer, to prevent a reduction in the charging characteristics of the laminated photoreceptive layer, and to prevent image fogging (so-called black spots). As a result, it is possible to maintain good electrophotographic characteristics such as the charging characteristics over the entire life.

The undercoat layer can be formed by, for example, dissolving a binder resin in an appropriate solvent to prepare an undercoat layer coating liquid, applying the coating liquid on the surface of the conductive base, and then removing the organic solvent by drying.

Examples of the binder resin include, in addition to binder resins similar to that included in the laminated photoreceptive layer described later, naturally-occurring polymer materials such as casein, gelatin, polyvinyl alcohol, and ethyl cellulose. Each of these binder resins may be used alone or in combination of two or more types.

The binder resin is required to have characteristics such as not dissolving or swelling in the solvent used when forming the photoreceptor layer on the undercoat layer, to have excellent adhesion to the conductive base, and to have flexibility. Accordingly, among the binder resins described above, a polyamide resin is preferable, and an alcohol-soluble nylon resin is particularly preferable.

Examples of the alcohol-soluble nylon resin include monopolymerized or copolymerized nylon such as 6-nylon, 66-nylon, 610-nylon, 11-nylon, and 12-nylon; and chemically-modified nylon resins such as N-alkoxy methyl-modified nylon.

Examples of the solvents for dissolving or dispersing the resin materials include water, alcohols such as methanol, ethanol, and butanol, glymes such as methyl carbitol and butyl carbitol, chlorinated solvents such as dichloroethane, chloroform, and trichloroethane, acetone, dioxolane, and mixture solvents derived by mixing two or more types of these solvents. Among these solvents, non-halogenated organic solvents are preferably used in consideration for the global environment.

The undercoat layer coating liquid may also contain inorganic compound microparticles. The purpose of blending of the inorganic compound microparticles in the undercoat layer is different to that of the inorganic compound microparticles of the outermost surface layer, and may be the same compound or a different compound.

The inorganic compound microparticles can easily adjust the volume resistance value of the undercoat layer, further suppress the injection of charge to the laminated photoreceptive layer, as well as maintain the electrical characteristics of the photoreceptor in a variety of environments. Examples of the inorganic compound microparticles include titanium oxide, aluminum oxide, aluminum hydroxide, and tin oxide.

The ratio (C/D) of the total weight C of the binder resin and the inorganic compound microparticles in the undercoat layer coating liquid to the weight D of the solvent is preferably 1/99 to 40/60, and particularly preferably 2/98 to 30/70.

In addition, the ratio E/F of the weight of the binder resin E to the weight of the inorganic compound microparticles F is preferably 90/10 to 1/99, and particularly preferably 70/30 to 5/95.

In order to disperse the inorganic compound microparticles in the undercoat layer coating liquid, a known device may be used such as a ball mill, a sand mill, an attritor, a vibration mill, a sonic disperser, or a paint shaker.

In terms of the application method of the undercoat layer coating liquid, an optimal method may be appropriately selected in consideration of the physical properties of the coating liquid and the productivity, and examples include a spray method, a bar coating method, a roll coating method, a blade method, a ring method, and an immersion coating method.

Among these methods, the immersion coating method is a method in which a substrate is immersed in a coating bath filled with a coating liquid, and then raised at a constant speed or a continuously changing speed to form a layer on the surface of the substrate. Because the method is relatively simple and excellent in terms of productivity and cost, it can be suitably used for producing the photoreceptor. The device used in the immersion coating method may be equipped with a coating liquid disperser typified by an ultrasonic wave generator for the purpose of stabilizing the dispersibility of the coating liquid.

The solvent in the coating film may be removed by natural drying, but may also be forcibly removed by heating.

The temperature in such a drying step is not particularly limited as long as the solvent used can be removed, but the temperature is preferably about 50 to 140° C., and particularly preferably about 80 to 130° C. If the drying temperature is lower than 50° C., the drying time may be prolonged, and the solvent does not sufficiently evaporate and remains in the photoreceptor layer in some cases. In addition, if the drying temperature is higher than about 140° C., the electric properties of the photoreceptor with repeated use becomes poor and the obtained image may deteriorate. Such a temperature condition is common in formation of not only the undercoat layer but also layers such as a laminated photoreceptive layer described later, and in other treatments.

The film thickness of the undercoat layer is not particularly limited, but is preferably 0.01 to 20 μm, more preferably 0.05 to 10 μm. If the film thickness of the undercoat layer is smaller than 0.01 μm, the layer may not substantially function as an undercoat layer, fail to coat defects on the conductive base to provide an even surface property, and fail to prevent injection of charges from the conductive base to the laminated photoreceptive layer. On the other hand, if the film thickness of the undercoat layer is larger than 20 μm, an even undercoat layer may be less likely to form, and the sensitivity of the photoreceptor may also be reduced.

Additionally, when the constituent material of the conductive base is aluminum, a layer containing alumite (alumite layer) can be formed and used as the undercoat layer.

Charge Generating Layer 13

The charge generating layer has a function of generating charges by absorbing emitted light such as a semiconductor laser beam in an image forming device or the like. The charge generating layer contains a charge generating substance as a main component and, as necessary, contains a binder resin and additives.

As the charge generating substance, a compound used in the art can be used, and specific examples thereof include azo-based pigments such as monoazo-based pigments, bisazo-based pigments, and trisazo-based pigments; indigo-based pigments such as indigo and thioindigo; perylene-based pigments such as perylene imide and perylene anhydride; polycyclic quinone-based pigments such as anthraquinone and pyrene quinone; phthalocyanine-based pigments such as metallic phthalocyanines including titanyl phthalocyanine and metal-free phthalocyanines; organic photoreceptive materials such as squarylium dyes, pyrylium salts, thiopyrylium salts, and triphenylmethane-based pigments; and inorganic photoreceptive materials such as selenium and amorphous silicon, from which one having sensitivity in an exposure wavelength range can be appropriately selected to be used. Each of these charge generating substances may be used alone or in combination of two or more types.

Among these charge generating substances, a titanyl phthalocyanine represented by the following general formula (A) is preferably used:

[Formula 1]

(A)

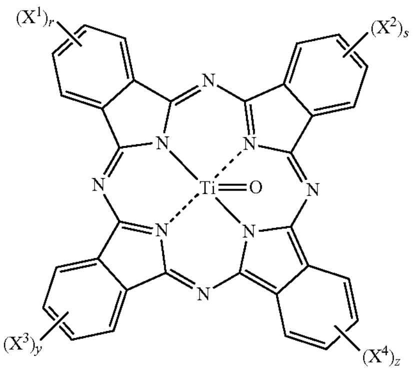

(wherein $X^1$, $X^2$, $X^3$, and $X^4$ are identically or independently a halogen atom, an alkyl group, or an alkoxy group, and r, s, y, and z are identically or independently an integer of 0 to 4).

Titanyl phthalocyanine is a charge generating substance that has a high charge generation efficiency and charge injection efficiency in an emission wavelength range (near-infrared light) of laser light and LED light currently and commonly used, and can generate a large amount of charge by absorbing light, as well as efficiently inject the generated charge into a charge transporting substance without accumulating inside.

Titanyl phthalocyanine represented by the general formula (A) can be produced by a known production method such as a method described in Moser, Frank H and Arthur L. Thomas, Phthalocyanine Compounds, Reinhold Publishing Corp., New York, 1963.

For example, among titanyl phthalocyanine compounds represented by general formula (A), an unsubstituted titanyl phthalocyanine in which r, s, y, and z are zero can be obtained by heat-melting phthalonitrile and titanium tetrachloride or heat-reacting them in a suitable solvent such as a-chloronaphthalene to synthesize a dichlorotitanyl phthalocyanine, and then hydrolyzing the dichlorotitanyl phthalocyanine with a base or water. In addition, the titanyl phthalocyanine composition can also be manufactured by heat reaction of isoindoline with titanium tetraalkoxide such as tetrabutoxytitanium in a suitable solvent such as N-methylpyrrolidone.

Examples of the method for forming the charge generating layer may include a method of vacuum-depositing the charge generating substance on the conductive base, and a method of applying a charge generating layer coating liquid obtained by dispersing the charge generating substance into a solvent, on the conductive base. Among these methods, it is preferable to use a method of dispersing the charge generating substance in a binder resin solution obtained by mixing the binder resin into a solvent in accordance with a conventional known method, and applying the charge generating layer coating liquid on the conductive base. This method will be explained below.

The binder resin is not particularly limited and can employ any resin known in the art, and examples of the binder resin include resins such as polyester, polystyrene, polyurethane, phenol resins, alkyd resins, melamine resins, epoxy resins, silicone resins, acrylic resins, methacrylic resins, polycarbonate, polyarylate, polyphenoxy, polyvinyl butyral, and polyvinyl formal, as well as copolymer resins containing two or more of repeated units constituting these resins.

Examples of the copolymer resins include insulative resins such as vinyl chloride-vinyl acetate copolymer resins, vinyl chloride-vinyl acetate-maleic anhydride copolymer resins, and acrylonitrile-styrene copolymer resins. Each of these resins may be used alone or in combination of two or more types.

Examples of the solvent include halogenated hydrocarbons such as dichloromethane and dichloroethane; ketones such as acetone, methylethylketone, and cyclohexanone; esters such as ethyl acetate and butyl acetate; ethers such as tetrahydrofuran (THF) and dioxane; alkyl ethers of ethylene glycol such as 1,2-dimethoxy ethane; aromatic hydrocarbons such as benzene, toluene, and xylene, and polar aprotic solvents such as N,N-dimethylformamide and N,N-dimethylacetamide. Each of these solvents may be used alone or in combination of two or more types.

In terms of the blending ratio of the charge generating substance and the binder resin, the ratio of the charge generating substance is preferably in a range of 10 to 99% by mass.

If the ratio of the charge generating substance is lower than 10% by mass, the sensitivity may decrease. On the other hand, if the ratio of the charge generating substance is higher than 99% by mass, not only the film strength of the charge generating layer may decrease, but the dispersibility of the charge generating substance may also reduce to increase large, rough particles, thus reducing surface charges in parts other than those to be deleted by exposure and generating many image defects; specifically a type of image fog called black spots, where toner adheres to a white background and forms minute black dots.

Before dispersing the charge generating substance into a binder resin solution, the charge generating substance may be grinded with a grinder in advance. Examples of the grinder used for the grinding include a ball mill, a sand mill, an attritor, a vibration mill, and a sonic disperser. Examples of a disperser used in dispersing the charge generating substance into the binder resin solution include a paint shaker, a ball mill, and a sand mill. As conditions for this dispersion, it is only necessary to select appropriate conditions for preventing contamination with impurities due to wear or the like of members constituting the container and disperser to be used.

Examples of the method for applying the charge generating layer coating liquid include the same methods as for applying the undercoat layer coating liquid, and the immersion coating method is particularly preferable.

The film thickness of the charge generating layer is not particularly limited, but is preferably 0.05 to 5 μm, more preferably 0.1 to 1 μm. If the film thickness of the charge generating layer is smaller than 0.05 μm, the light absorption efficiency may decrease to lower the sensitivity of the photoreceptor. On the other hand, if the film thickness of the charge generating layer is larger than 5 μm, the charge transfer inside the charge generating layer becomes a rate-limiting step in the process of removing the charges on the laminated photoreceptive layer surface, and the sensitivity of the photoreceptor may decrease.

Charge Transporting Layer 14

The charge transporting layer has a function of receiving charges generated in the charge generating substance and transporting the charges to the photoreceptor surface, and contains a charge transporting substance, a binder resin, and silica particles, and as required, an additive.

As the charge transporting substance, a compound used in the art can be used.

Specific examples of the charge transporting substance include carbazole derivatives, pyrene derivatives, oxazole derivatives, oxadiazole derivatives, thiazole derivatives, thiadiazole derivatives, triazole derivatives, imidazole derivatives, imidazolone derivatives, imidazolidine derivatives, bis(imidazolidine) derivatives, styryl compounds, hydrazone compounds, polycyclic aromatic compounds, indole derivatives, pyrazoline derivatives, oxazolone derivatives, benzimidazole derivatives, quinazoline derivatives, benzofuran derivatives, acridine derivatives, phenazine derivatives, aminostilbene derivatives, triarylamine derivatives, triarylmethane derivatives, phenylenediamine derivatives, stilbene derivatives, butadiene derivatives, enamine derivatives, benzidine derivatives, polymers having a group derived from these compounds in a main chain or a side chain (such as poly-N-vinyl carbazole, poly-1-vinyl pyrene, ethylcarbazole-formaldehyde resin, triphenyl methane polymer, and poly-9-vinyl anthracene), and polysilane. Each of these charge transporting substances may be used alone or in combination of two or more types.

Among these various charge transporting substances, in view of electrical characteristics, durability, and chemical stability, stilbene derivatives, butadiene derivatives, enamine derivatives, and conjugates of several types of these compounds are preferable; stilbene derivatives are more preferable; and stilbene compounds represented by the following general formula (I) are particularly preferable from the perspective of minimizing an increase in the residual potential and deterioration in sensitivity, and exhibiting good electrophotographic characteristics:

[Formula 2]

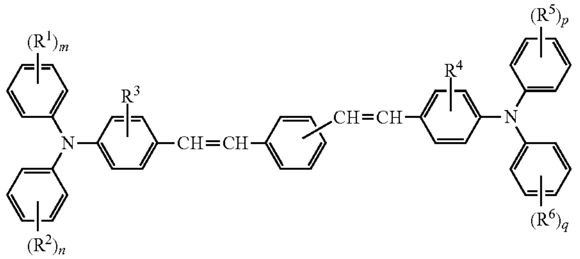

(wherein $R^1$, $R^2$, $R^5$, and $R^6$ are identically or independently an alkyl group, an alkoxy group, an aryl group, or an aralkyl group; m, n, p, and q are identically or independently an integer of 0-3; and R3 and R4 are identically or independently a hydrogen atom or an alkyl group).

The substituents R1, R2, R5, and R6 in the general formula (I) will be described.

Examples of the alkyl groups include alkyl groups having 1 to 6 carbon atoms, such as methyl, ethyl, n-propyl, isopropyl, n-butyl, isobutyl, sec-butyl, tert-butyl, n-pentyl, and n-hexyl.

Examples of the alkoxy groups include alkoxy groups having 1 to 6 carbon atoms such as methoxy, ethoxy, n-propoxy, isopropoxy, tert-butoxy, n-pentyloxy, and n-hexyloxy.

Examples of the aryl groups include phenyl, naphthyl, anthryl, phenanthryl, fluorenyl, biphenylyl, and o-terphenyl.

Examples of the aralkyl groups include benzyl, phenethyl, benzhydryl, and trityl.

Examples of the halogen atom include fluorine, chlorine, bromine, and iodine.

The m, n, p, and q, which represent exponents of the substituents $R^1$, $R^2$, $R^5$ and $R^6$, are identically or independently an integer of 0 to 3. If the exponent is 2 or larger, each of the substituents may be different from each other.

In addition, examples of the alkyl groups on the substituents $R^3$ and $R^4$ in general formula (I) include alkyl groups having 1 to 3 carbon atoms, such as methyl, ethyl, n-propyl, and isopropyl.

The stilbene compounds represented by the general formula (I) can be synthesized by, for example, a method described in the prior art.

Examples of the stilbene compounds represented by the general formula (I) include the following compounds (1) to (3), and in view of printing durability in forming the laminated photoreceptive layer, compound (1) is particularly preferable.

[Formula 3]

compound (1)

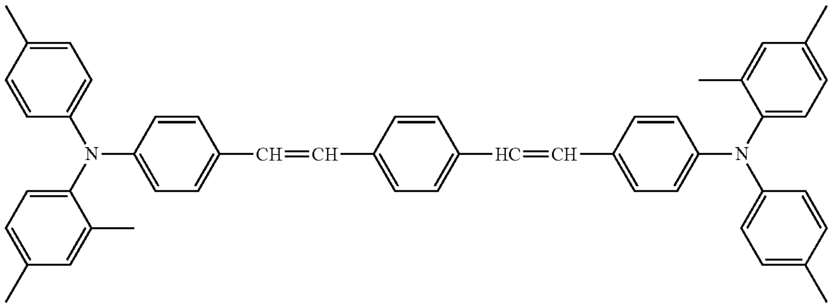

compound (2)

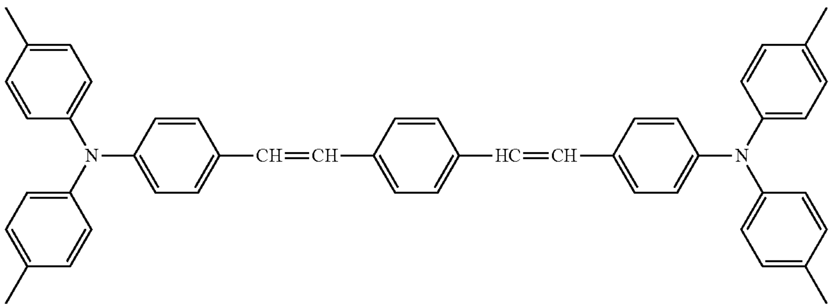

compound (3)

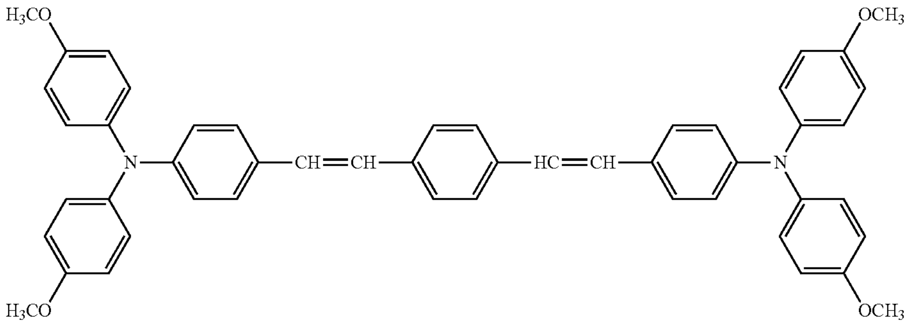

The charge transporting substance preferably has an ionization potential of 5.4 eV or more and 5.55 eV or less.

When the ionization potential is less than 5.4 eV, damage such as oxidative gases increases in the actual machine, and the initial electrical characteristics can sometimes deteriorate. On the other hand, when hole transport trap sites are formed as a result of an abrasion component of a metal oxide entering the photoreceptive layer and the ionization potential exceeds 5.55 eV, the hole trapping effect becomes large, which can sometimes cause the residual potential to rise and the sensitivity to deteriorate. Therefore, for long-term use, an ionization potential in the above range is appropriate.

The ionization potential of the charge transporting substance is particularly preferably 5.4 eV or more and 5.52 eV or less.

A method of forming the charge transporting layer is preferably a method of dispersing the charge transporting substance and the inorganic compound microparticles into a binder resin solution derived by mixing the binder resin into a solvent in accordance with a conventional known method, and applying the charge transporting layer coating liquid on the charge generating layer. This method will be explained below.

The binder resin is not particularly limited, and any resin known in the art can be used as the binder resin. Examples of the binder resin include vinyl polymer resins such as polymethylmethacrylate, polystyrene, and polyvinyl chloride, and copolymer resins thereof; resins such as polycarbonate, polyester, polyester carbonate, polysulfone, polyphenoxy, epoxy resins, silicone resins, polyarylate, polyphenylene oxide, polyamide, polyether, polyurethane, polyacrylamide, and phenol resins; and thermosetting resins obtained by partially crosslinking these resins. Each of these binder resins may be used alone or in combination of two or more types.

Among these, polystyrene, polycarbonate, polyarylate, and polyphenyleneoxide are preferable because they have a volume resistance value of $10^{13}\Omega$ or more and excellent electrical insulation properties, as well as excellent film formation properties, potential characteristics, and the like.

[Formula 4]

(B)

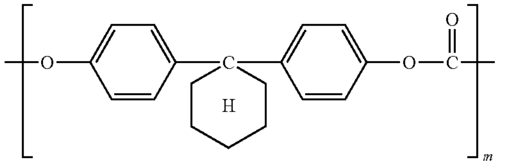

(in Formula 4, “m” indicates a degree of polymerization from 10 to 5,000.) Further, resins having a polycarbonate Z-skeleton represented by structural formula (B) below, or a polyarylate skeleton represented by structural formula (C) below are particularly preferable, and resins having a polyarylate skeleton are even more preferable.

[Formula 5]

(C)

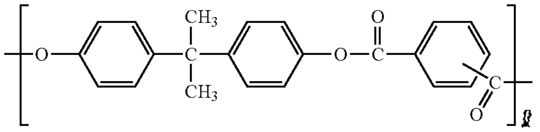

(in Formula 5, “I” indicates a degree of polymerization from 10 to 5,000.) By using these resins, damage to the electrical fatigue of the photoreceptor is reduced, the resistance is improved, and stable image characteristics can be provided throughout the entire life of the photoreceptor. Therefore, it is possible to realize a photoreceptor with a high printing durability and an extended life.

The ratio A/B of the charge transporting substance (A) to the binder resin (B) is preferably 10/12 to 10/30.

When the ratio A/B is less than 10/30 and the ratio of the binder resin is increased, the viscosity of the coating liquid increases when forming the charge transporting layer using the immersion coating method. Therefore, the application speed decreases and the productivity significantly deteriorates. Moreover, when the content of the solvent in the coating liquid is increased in order to prevent an increase in the viscosity of the coating liquid, a brushing phenomenon may occur and generate white turbidity in the charge transporting layer that is formed. On the other hand, when the ratio A/B exceeds 10/12 and the ratio of the binder resin is decreased, the printing durability decreases relative to a case where the ratio of the binder resin is high, which can sometimes increase the amount of wear of the laminated photoreceptive layer.

As described under the heading <Silica Particle Content>, the content of silica particles is preferably 7% by mass or more to 25% by mass as a proportion of the charge transporting layer forming the outermost surface layer.

For the purpose of improving film formation properties, flexibility, and surface smoothness, the charge transporting layer may contain additives such as plasticizers and leveling agents, as necessary.

Examples of the plasticizers include dibasic acid esters such as phthalic acid ester, fatty acid ester, phosphoric acid ester, chlorinated paraffin, and epoxy-type plasticizers.

Examples of the leveling agents include silicone-based leveling agents. For the purpose of enhancing the mechanical strength and improving the electrical properties, the charge transporting layer may also contain microparticles of an inorganic compound or an organic compound.

Examples of the solvents include aromatic hydrocarbons such as benzene, toluene, xylene, and monochlorobenzene; halogenated hydrocarbons such as dichloromethane and dichloroethane; ethers such as THE, dioxane, and dimethoxy methyl ether; and polar aprotic solvents such as N,N-dimethylformamide. Additionally, a solvent such as an alcohol, acetonitrile, and methylethylketone can also be further added and used as necessary. Among these solvents, non-halogenated organic solvents are preferably used in consideration for the global environment. Each of these solvents may be used alone or in combination of two or more types.

The charge transporting layer is formed by, for example, as with the formation of the charge generating layer 13 described above, dissolving or dispersing the charge transporting substance and the binder resin, and if required, the above-mentioned additive, into an appropriate solvent and preparing a charge transporting layer coating liquid, and applying the coating liquid on the charge generating layer 13 by spraying, bar coating, roll coating, a blade technique, a ring technique, or immersion application. Among these application methods, immersion application is particularly excellent in view of the various points described above, and thus is also often utilized in forming the charge transporting layer.

The charge transporting layer of the photoreceptor of the present disclosure contains a specific amount of Na element and/or K element, and also a specific amount of Ca element and/or Mg elements in a specific ratio to the silica particles.

In order to include these elements in the charge transporting layer, for example, when forming the charge transporting layer by an application method, compounds containing these elements, namely oxide compounds, may be added to the charge transporting layer coating liquid.

Examples of addition methods include a method in which a coating liquid is prepared using equipment made of a material containing a compound containing these elements, and then mixing the compound containing these elements into the coating liquid due to wear of the equipment. The mixing amount may be adjusted by the preparation method of the coating liquid and the processing time.

Furthermore, specific amounts of compounds containing the elements above may be added to a coating liquid prepared under conditions in which the material of the equipment does not become mixed into the coating liquid. In terms of the content and content ratios of the silica particles and each of the elements, a converted value of the solid content in the coating liquid is considered to be substantially equivalent to the measured value in the charge transporting layer that is formed.

The film thickness of the charge transporting layer is not particularly limited, but is preferably 5 to 50 μm, and more preferably 10 to 40 μm.

If the film thickness of the charge transporting layer is less than 5 μm, the charge retainability of the photoreceptor surface decreases in some cases. On the other hand, if the film thickness of the charge transporting layer is more than 50 μm, resolution of the photoreceptor decreases in some cases.

Second Charge Transporting Layer 16

As shown in FIG. 2, the charge transporting layer of the photoreceptor of the present disclosure is a first charge transporting layer 15 and a second charge transporting layer 16 laminated in this order on the charge generating layer. The first charge transporting layer 15 contains a charge transporting substance and a binder resin, and the second charge transporting layer 16 contains a charge transporting substance, a binder resin, and silica particles 18. That is, the charge transporting layer consists of two layers, and the silica particles 18 may be included in the second charge transporting layer 16, which forms the outermost surface layer of the photoreceptor.

This makes it possible to separate the functions of each layer, and by including silica in only the second charge transporting layer, it is possible to improve the printing durability of the photoreceptive layer overall by making the outermost surface layer a hardened film.

Examples of the charge transporting substance, the binder resin, and the silica particles include those described under the heading <Charge Transporting Layer>.

The first charge transporting layer 15 and the second charge transporting layer 16 are, for example, in a similar manner to the case of forming the charge generating layer 13 and the charge transporting layer 14 described above, formed by preparing each of a first charge transporting layer coating liquid and a second charge transporting layer coating liquid, and then applying the respective coating liquids on the charge generating layer 13 and the first charge transporting layer 15 by spraying, bar coating, roll coating, a blade technique, a ring technique, or immersion application. Among these application methods, immersion application is particularly excellent in view of the various aspects described above. Therefore, it is also often utilized in forming these layers.

The film thickness of the first charge transporting layer is not particularly limited, but is preferably 15 to 50 μm, and more preferably 25 to 40 μm.

The film thickness of the second charge transporting layer is not particularly limited, but is preferably 5 to 20 μm, and more preferably 5 to 10 μm.

A photoreceptor used repeatedly for a long period of time is designed so as to be mechanically durable, and less likely to be worn. However, inside an actual machine, ozone and NOx gas or the like are generated from a charge member and the like and adheres to the surface of the photoreceptor, and produces image deletion. For the purpose of preventing image deletion, the laminated photoreceptive layer is required to be worn at a certain constant speed or more, and in view of concern for repeated use over a long period of time, the second charge transporting layer preferably has a film thickness of at least 1.0 μm or more. Additionally, with a film thickness of more than 8.0 μm of the second charge transporting layer, problems may occur such as rise in the residual potential and reduction in reproducibility of minute dots.

(2) Image Forming Device 100

The image forming device of the present embodiment at least comprises: the electrophotographic photoreceptor of the present disclosure; a charger that charges the photoreceptor; an exposer that exposes the charged photoreceptor to form an electrostatic latent image; a developer that develops the electrostatic latent image formed by an exposure to form (visualize) a toner image; a transferer that transfers the toner image formed by a development onto a recording medium; a fuser that fuses the transferred toner image on the recording medium to form an image; a cleaner that removes and recovers toner remaining on the photoreceptor; and a charge eliminator that eliminates surface charges remaining on the photoreceptor.

The image forming device according to the present disclosure and operation thereof will be explained with reference to the figures, but is not limited to the following description.

FIG. 3 is a schematic side view illustrating a configuration of the image forming device according to the present disclosure.

The image forming device (laser printer) 100 in FIG. 3 is composed of the photoreceptor 1 according to the present disclosure, an exposer (semiconductor laser) 31, a charger (charging device) 32, a developer (developing device) 33, a transferer (transfer charging device) 34, a conveyor belt (not shown), a fuser (fusing device) 35, and a cleaner (cleaning device) 36. The reference numeral 51 represents a recording medium (a recording paper sheet or transfer paper sheet). The photoreceptor 1 may be the photoreceptor 2 of the present disclosure.

The photoreceptor 1 is rotatably supported in the image forming device 100 body, and rotationally driven in a direction of an arrow 41 around a rotation axis line 44 by a driving section not depicted. The driving section is configured by including, for example, an electric motor and a reduction gear, and transmits the driving force to the conductive base configuring a core body of the photoreceptor 1, thereby making the photoreceptor 1 rotationally drive at a predetermined circumferential speed. The charger (charging device) 32, the exposer 31, the developer (developing device) 33, the transferer (transfer charging device) 34, and the cleaner (cleaning device) 36 are arranged in this order along the outer peripheral surface of the photoreceptor 1 from an upstream side to a downstream side in the rotation direction of the photoreceptor 1 indicated by the arrow 41.

The charging device 32 is a charger that uniformly charges the outer peripheral surface of the photoreceptor 1 at a predetermined potential. The exposer 31 includes a semiconductor laser as a light resource, and emits laser beam light output from the light source, onto the surface of photoreceptor 1 between the charging device 32 and the developing device 33, thereby applying an exposure that corresponds to image information with respect to the outer peripheral surface of the charged photoreceptor 1. The light is scanned repeatedly in a direction of extension of the rotation axis line 44 of the photoreceptor 1, which is a main scanning direction, and these create an image and serially forms an electrostatic latent image on the surface of the photoreceptor 1. In other words, the presence or absence of laser beam irradiation generate a difference in the amount of charge on the photoreceptor 1 charged uniformly by the charging device 32, and forms an electrostatic latent image.

The developing device 33 is a developing section that develops the electrostatic latent image which is formed on the surface of the photoreceptor 1 by exposure, with a developing agent (toner), and is disposed facing the photoreceptor 1. It includes a development roller 33*a* that supplies toner to the outer peripheral surface of the photoreceptor 1, and a casing 33*b* that rotatably supports the development roller 33*a* around a rotation axis line parallel to the rotation axis line 44 of the photoreceptor 1, and also contains the developing agent including toner within an inner space.

The transfer charging device 34 is a transferring section that transfers the toner image, which is a visible image formed on the outer peripheral surface of the photoreceptor 1 by a development, on a transfer paper sheet 51, which is a recording medium supplied between the photoreceptor 1 and the transfer charging device 34 from a direction of an arrow 42 by a conveying section (not shown). The transfer charging device 34 is a contact transferring section that includes, for example, a charger, and provides polar charge opposite to toner on the transfer paper sheet 51, thereby transferring the toner image onto the transfer paper sheet 51.

The cleaner 36 is a cleaning section that removes and recovers toner remaining on the outer peripheral surface of the photoreceptor 1 after the transferring operation by the transfer charging device 34, and includes a cleaning blade 36*a* that peels off the toner remaining on the outer peripheral surface of the photoreceptor 1, and a collecting casing 36*b* that accommodates the toner peeled off by the cleaning blade 36*a*. The cleaner 36 is also disposed with a static eliminating lamp (not shown).

The image forming device 100 also includes a fusing device 35, which is a fuser that fuses the image thus transferred, in a downstream part to which the transfer paper sheet 51 passed between the photoreceptor 1 and the transfer charging device 34 is to be conveyed. The fusing device 35 includes a heat roller 35*a* having a heater not illustrated, and a pressure roller 35*b* arranged opposite to the heat roller 35*a* and pressed by the heat roller 35*a* to form a contact portion.

The reference numeral 37 indicates a separator that separates the transfer paper sheet from the photoreceptor, and the reference numeral 38 indicates a casing that accommodates each of the aforementioned sections in the image forming device.

The image forming operation by the image forming device 100 is performed as follows.

First, once the photoreceptor 1 is rotationally driven in the direction of the arrow 41 by the driver, the surface of the photoreceptor 1 is uniformly charged at a predetermined positive potential by the charging device 32 provided on the upstream side in the rotational direction of the photoreceptor 1 relative to an image forming point of the light from the exposer 31.

Subsequently, the exposer 31 emits light according to the image information toward the surface of the photoreceptor 1. In the photoreceptor 1, the surface charges of the part irradiated with light are removed by this exposure, and a difference is caused between the surface potential of the part irradiated with light and the surface potential of the part not irradiated with light, so that an electrostatic latent image is formed.

From the developing device 33 disposed on the downstream side in the rotational direction of the photoreceptor 1 relative to the image forming point of the light from the exposer 31, the toner is fed to the surface of the photoreceptor 1 on which an electrostatic latent image is formed, and then the electrostatic latent image is developed to form a toner image.

The transfer paper sheet 51 is fed to between the photoreceptor 1 and the transfer charging device 34 in synchronization with the exposure to the photoreceptor 1. The transfer charging device 34 provides the transfer paper sheet 51 thus supplied with polar charge opposite to the toner, and transfers the toner image formed on the surface of the photoreceptor 1 onto the transfer paper sheet 51.

The transfer paper sheet 51 having the toner image thus transferred is conveyed to the fusing device 35 by a conveying section, heated and compressed in passing through the contact part of the heat roller 35*a* and the pressure roller 35*b* of the fusing device 35, and the toner image is fused on the transfer paper sheet 51 to be a robust image. The transfer paper sheet 51 having an image formed in this manner is discharged out of the image forming device 100 by the conveying section.

Meanwhile, toner still remaining on the surface of the photoreceptor 1 after the transfer of the toner image by the transfer charging device 34 is peeled off and recovered from the surface of the photoreceptor 1 by the cleaner 36. The charge on the surface of the photoreceptor 1 that experiences removal of the toner in this manner is removed by light emitted from the charge eliminating lamp, and the electrostatic latent image on the surface of the photoreceptor 1 disappears. Then, the photoreceptor 1 is further rotationally driven, and the series of operations from charging is repeated again to form images consecutively.

(3) Method of Producing Electrophotographic Photoreceptor

The method of producing an electrophotographic photoreceptor of the present disclosure includes forming a charge transporting layer using a charge transporting layer coating liquid containing at least a charge transporting substance, a binder resin, and silica particles, and containing 0.1 ppm or more and 20 ppm or less of Na element and/or K element with respect to a solid content.

The materials constituting each layer, including the charge transporting layer, and the fabrication and conditions thereof are as described in (1) electrophotographic photoreceptor.

(4) Charge Transporting Layer Coating Liquid

The charge transporting layer coating liquid of the present disclosure includes at least a charge transporting substance, a binder resin, and silica particles, and contains 0.1 ppm or more and 20 ppm or less of Na element and/or K element with respect to a solid content.

The constituent materials of the charge transporting layer coating liquid and the blending amounts thereof are as described in <Charge Transporting Layer> in (1) Electrophotographic Photoreceptor.

EXAMPLES

Hereinafter, the present disclosure will be specifically explained in Examples and Comparative Examples with reference to the figures, but these examples do not limit the present disclosure.

Measurement of the ionization potential of the charge transporting substance used in the Examples and the Comparative Examples, elemental analysis of the charge transporting layer of the produced photoreceptors, and measurement of the surface roughness of the outermost surface layer were carried out as follows.

Ionization Potential of Charge Transporting Substance

The ionization potential (eV) was measured using an atmospheric photoelectron spectrometer (manufactured by Riken Keiki Co., Ltd., model: AC-2) at an output of 10 to 100 nW.

Elemental Analysis of Charge Transporting Layer

The Na, K, Ca and Mg element in the charge transporting layer was analyzed using an ICP emission spectrometer (manufactured by Thermo Fisher Scientific Co., Ltd., model: iCAP-6500).

Surface Roughness of Outermost Surface Layer Rz A surface roughness measurement device (manufactured by Tokyo Seimitsu Co., Ltd., model: Surfcom 1400D) was used to measure the surface roughness Rz (μm) of a central part with the measurement position being an axis in the horizontal direction of the outermost surface layer of the photoreceptor, at a standard length of 0.8 mm, a cutoff wavelength of 0.8 mm, a measurement speed of 0.1 mm/sec, and using a cutoff-type Gaussian method.

The Rz value corresponds to the ten-point surface roughness Rz as defined by JIS-B-0601 (1994).

Example 1

To 25 parts by mass of methyl alcohol, 3 parts by mass of titanium oxide (manufactured by Ishihara Sangyo Ltd., product name: TIPAQUE TTO-D-1) and 2 parts by mass of copolymerized polyamide (nylon) (manufactured by Toray Industries, Inc., product name: Amilan (registered trademark), grade: CM8000) were added and dispersed in a paint shaker for 8 hours to prepare 3 liters of an undercoat layer coating liquid.

The undercoat layer coating liquid thus obtained was filled in a coating tank, into which an aluminum drum-shaped base having a diameter of 30 mm and a length of 255 mm as the conductive base 11 was immersed, and then pulled up. The coating film thus obtained was dried naturally to form an undercoat layer 12 having a film thickness of 1 μm on the conductive base 11.

A titanyl phthalocyanine represented by the following structural formula, which was to be used as the charge generating substance, was prepared in advance.

[Formula 6]

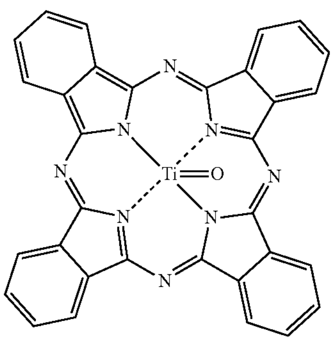

After mixing 29.2 g of diiminoisoindoline and 200 mL of sulfolane, 17.0 g of titanium tetraisopropoxide was further added, and reacted under nitrogen atmosphere at 140° C. for 2 hours. The reaction mixture thus obtained was allowed to cool, and then a precipitate was filtered off, successively washed with chloroform and 2% aqueous hydrochloric acid solution, further successively washed with water and methanol, and dried to provide 25.5 g of blue-violet crystals.

As a result of chemical analysis of the compound thus obtained, the compound was confirmed to be the titanyl phthalocyanine represented by the above structural formula (yield: 88.5%).

One mass part of titanyl phthalocyanine thus obtained and 1 part by mass of a butyral resin (manufactured by Sekisui Chemical Co., Ltd., product name: S-LEC BM-2) were added to 98 parts by mass of methylethylketone, and dispersed with a paint shaker for 2 hours to prepare 3 liters of a charge generating layer coating liquid.

The charge generating layer coating liquid thus obtained was applied on the undercoat layer 12 in the same immersion technique as for the formation of the undercoat layer, and the coating film thus obtained was dried naturally to form a charge generating layer 13 having a film thickness of 0.3 μm.

Next, in a 140 mL volume soda-lime glass container, 4 g of silica particles (number average primary particle size 16 nm, surface treated with dimethyldichlorosilane, manufactured by Nippon Aerosil Co., Ltd., product name: AEROSIL (registered trademark) R972) were suspended in 36 g of tetrahydrofuran, and a stirring process was performed for 15 hours with a stirrer (manufactured by Sibata Scientific Technology Co., Ltd., model: M-103) and a stirring blade.

To the obtained silica particle (silica filler) suspension, 13.8 g of compound (1), which serves as the charge transporting substance and is represented by the structural formula below, 22.2 g of polycarbonate (manufactured by Teijin Chemicals Ltd., product name: TS2040), and 105.8 g of tetrahydrofuran were added, and these were mixed and subjected to a stirring process for 30 hours with a stirrer and stirring blade.

The obtained mixture was subjected to a 6-pass dispersion process using a particle dispersing device (manufactured by Microfluidics Corporation, model: Microfluidizer M110P) to prepare 133 g of the charge transporting layer coating liquid, and this was allowed to stand under 20° C. conditions.

[Formula 7]

compound (1)

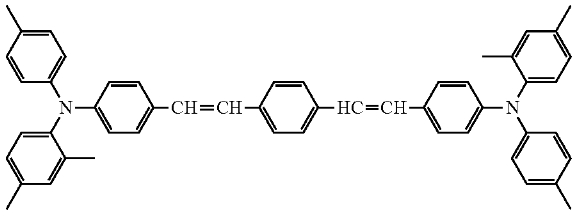

The obtained charge transporting layer coating liquid was applied on the charge generating layer 13 in an immersion technique similar to the case of formation of the undercoat layer, and resulting coating film was dried at 115° C. for 1.5 hours to form a charge transporting layer 14 having a film thickness of 35 μm, thus providing the photoreceptor 1 shown in FIG. 1. Compound (1) (stilbene compound) prepared in advance based on a method described in the prior art was used as the charge transporting substance (ionization potential 5.47 eV).

FIG. 4 is a scanning transmission electron microscope image showing a dispersed state of silica particles on the surface of the charge transporting layer of the obtained photoreceptor. From this diagram, it can be seen that interaction between the silica particles is optimally exhibited, and a loosely aggregated structure such as a uniform network structure in which the silica particles are interconnected is formed, that is, a sea-island structure having islands of black silica particles in a sea of white binder resin is formed.

Example 2

Except for preparing the charge transporting layer coating liquid as follows, the photoreceptor 1 shown in FIG. 1 was obtained in the same manner as in Example 1.

To a 250 mL volume polypropylene container were added 9 g of silica particles (number average primary particle size 16 nm, surface treated with dimethyldichlorosilane, manufactured by Nippon Aerosil Co., Ltd., product name: AEROSIL (registered trademark) R972) and 81 g of tetrahydrofuran. Then, 2 mm diameter soda-lime glass beads (150 g) were inserted and mixed, and the obtained mixture was further processed for 10 hours in a ball mill (manufactured by Eishin Co., Ltd., model: desktop ball mill BM-15).

The glass beads were removed from the obtained mixture, and 13.0 g of compound (1) which serves as the charge transporting substance, 20.8 g of polycarbonate (manufactured by Teijin Chemicals Ltd., product name: TS2040), and 70.9 g of tetrahydrofuran were added, and these were mixed and subjected to a stirring process for 30 hours with a stirrer and stirring blade.

The obtained mixture was subjected to a 6-pass dispersion process using a particle dispersing device to prepare 148 g of the charge transporting layer coating liquid, and this was allowed to stand under 20° C. conditions.

Example 3

In the preparation of the silica filler suspension of the charge transporting layer coating liquid, the amount of silica particles was changed from 9 g to 4 g, and the amount of tetrahydrofuran was changed from 81 g to 36 g.

Further, with respect to the amounts added to the silica filler suspension, the amount of compound (1) which serves as the charge transporting substance was changed from 13.0 g to 13.8 g, the amount of polycarbonate was changed from 20.8 g to 22.2 g, and the amount of tetrahydrofuran was changed from 70.9 g to 105.8 g. Otherwise, the photoreceptor 1 shown in FIG. 1 was obtained in the same manner as in Example 2.

Example 4

In the preparation of the silica filler suspension of the charge transporting layer coating liquid, the stirring time was changed from 15 hours to 8 hours. Otherwise, the photoreceptor 1 shown in FIG. 1 was obtained in the same manner as in Example 1.

Example 5

In the preparation of the silica filler suspension of the charge transporting layer coating liquid, the silica particles were changed to silica particles (number average primary particle size 40 nm, surface treated with hexamethyldisilazane, manufactured by Nippon Aerosil Co., Ltd., product name: AEROSIL (registered trademark) RX50). Otherwise, the photoreceptor 1 shown in FIG. 1 was obtained in the same manner as in Example 1.

Example 6

In the preparation of the silica filler suspension of the charge transporting layer coating liquid, the amount of silica particles was changed from 4 g to 3 g, and the amount of tetrahydrofuran was changed from 36 g to 27 g. Further, with respect to the amounts added to the silica filler suspension, the amount of compound (1) which serves as the charge transporting substance was changed from 13.8 g to 16.6 g, the amount of polycarbonate was changed from 22.2 g to 26.6 g, and the amount of tetrahydrofuran was changed from 105.8 g to 136.6 g. Otherwise, the photoreceptor 1 shown in FIG. 1 was obtained in the same manner as in Example 1.

Example 7

In the preparation of the silica filler suspension of the charge transporting layer coating liquid, the amount of silica particles was changed from 4 g to 10 g, the amount of tetrahydrofuran was changed from 36 g to 90 g, and the stirring time was changed from 15 hours to 45 hours. Further, with respect to the amounts added to the silica filler suspension, the amount of compound (1) which serves as the charge transporting substance was changed from 13.8 g to 11.5 g, the amount of polycarbonate was changed from 22.2 g to 18.5 g, and the amount of tetrahydrofuran was changed from 105.8 g to 51.8 g. Otherwise, the photoreceptor 1 shown in FIG. 1 was obtained in the same manner as in Example 1.

Example 8

In the preparation of the silica filler suspension of the charge transporting layer coating liquid, the amount of silica particles was changed from 9 g to 3 g, and the amount of tetrahydrofuran was changed from 81 g to 27 g. Further, with respect to the amounts added to the silica filler suspension, the amount of compound (1) which serves as the charge transporting substance was changed from 13.0 g to 15.3 g, the amount of polycarbonate was changed from 20.8 g to 24.5 g, and the amount of tetrahydrofuran was changed from 70.9 g to 124.9 g. Otherwise, the photoreceptor 1 shown in FIG. 1 was obtained in the same manner as in Example 2.

Example 9

In the preparation of the silica filler suspension of the charge transporting layer coating liquid, the 4 g of silica particles was changed to 9 g of silica particles (number average primary particle size 16 nm, surface treated with hexamethyldisilazane, manufactured by Nippon Aerosil Co., Ltd., product name: AEROSIL (registered trademark) NX130), and the amount of tetrahydrofuran was changed from 36 g to 81 g. Further, with respect to the amounts added to the silica filler suspension, the amount of compound (1) which serves as the charge transporting substance was changed from 13.8 g to 12.3 g, the amount of polycarbonate was changed from 22.2 g to 19.6 g, and the amount of tetrahydrofuran was changed from 105.8 g to 64.0 g. Otherwise, the photoreceptor 1 shown in FIG. 1 was obtained in the same manner as in Example 2.

Example 10

In the preparation of the silica filler suspension of the charge transporting layer coating liquid, the 4 g of silica particles was changed to 9 g of silica particles (number average primary particle size 16 nm, surface treated with hexamethyldisilazane, manufactured by Nippon Aerosil Co., Ltd., product name: AEROSIL (registered trademark) NX130), and the amount of tetrahydrofuran was changed from 36 g to 81 g. Further, with respect to the amounts added to the silica filler suspension, the amount of compound (1) which serves as the charge transporting substance was changed from 13.8 g to 10.4 g, the amount of polycarbonate was changed from 22.2 g to 16.6 g, and the amount of tetrahydrofuran was changed from 105.8 g to 46.6 g. Otherwise, the photoreceptor 1 shown in FIG. 1 was obtained in the same manner as in Example 2.

Example 11

In the preparation of the silica filler suspension of the charge transporting layer coating liquid, the amount of silica particles was changed from 4 g to 3 g, and the amount of tetrahydrofuran was changed from 36 g to 27 g. Further, with respect to the amounts added to the silica filler suspension, the amount of compound (1) which serves as the charge transporting substance was changed from 13.8 g to 16.6 g, the 22.2 g of polycarbonate was changed to 26.6 g of polyarylate (manufactured by Mitsubishi Chemical Corporation, product name: E2-400), and the amount of tetrahydrofuran was changed from 105.8 g to 136.6 g. Otherwise, the photoreceptor 1 shown in FIG. 1 was obtained in the same manner as in Example 1.

Example 12

In the preparation of the charge transporting layer coating liquid, a triphenylamine compound (TPD) (ionization potential 5.51 eV, manufactured by Tokyo Kasei Kogyo Co., Ltd., product name: D2448) represented by the following structural formula (a) was used as the charge transporting substance. Otherwise, the photoreceptor 1 shown in FIG. 1 was obtained in the same manner as in Example 1.

[Formula 8]

(a)

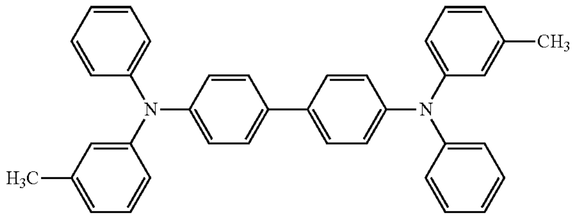

Example 13

In the preparation of the charge transporting layer coating liquid, a styryl compound (ionization potential 5.61 eV, manufactured by Takasago Chemical Co., Ltd., product name: CT-3) represented by the following structural formula (b) was used as the charge transporting substance. Otherwise, the photoreceptor 1 shown in FIG. 1 was obtained in the same manner as in Example 1.

[Formula 9]

(b)

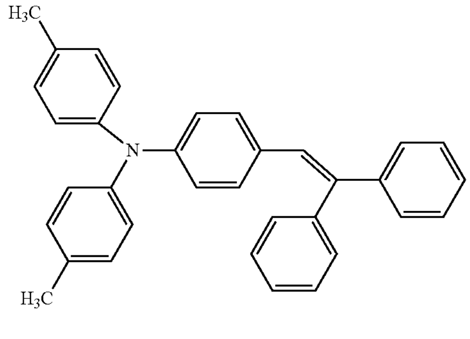

Example 14

The undercoat layer 12 and the charge generating layer 13 were formed on the conductive base 11 in the same manner as in Example 1.

Then, to a 900 mL volume soda-lime glass container were added 25 g of compound (1) as the charge transporting substance, 37.5 g of polycarbonate (manufactured by Teijin Chemicals Ltd., product name: TS2040), and 250 g of tetrahydrofuran, and these were mixed and subjected to a stirring process for 15 hours in a ball mill to prepare 312.5 g of a first charge transporting coating liquid.

The obtained charge transporting layer coating liquid was applied on the charge generating layer 13 by an immersion technique similar to the case of formation of the undercoat layer, and the obtained coating film was dried at 115° C. for 1.5 hours to form a first charge transporting layer having a film thickness of 35 μm.

Then, a second charge transporting layer coating liquid prepared in the same manner as in Example 2 was applied on the first charge transporting layer by spray painting, and the obtained coating film was dried at 120° C. for 0.5 hours to form the second charge transporting layer having a film thickness of 5 μm, affording the photoreceptor 2 shown in FIG. 1 having a charge transporting layer consisting of two layers.

Example 15

Except for not forming the undercoat layer, the photoreceptor 1 shown in FIG. 1 was obtained in the same manner as in Example 1.

Example 16

In the preparation of the silica filler suspension of the charge transporting layer coating liquid, the silica particles were changed to silica particles (number average primary particle size 7 nm, surface treated with dimethyldichlorosilane, manufactured by Nippon Aerosil Co., Ltd., product name: AEROSIL (registered trademark) R976). Otherwise, the photoreceptor 1 shown in FIG. 1 was obtained in the same manner as in Example 1.

Example 17

In the preparation of the silica filler suspension of the charge transporting layer coating liquid, the silica particles were changed to silica particles (number average primary particle size 12 nm, surface treated with dimethyldichlorosilane, manufactured by Nippon Aerosil Co., Ltd., product name: AEROSIL (registered trademark) R974). Otherwise, the photoreceptor 1 shown in FIG. 1 was obtained in the same manner as in Example 1.

Example 18

In the preparation of the silica filler suspension of the charge transporting layer coating liquid, the silica particles were changed to silica particles (number average primary particle size 12 nm, surface treated with dimethyldichlorosilane, manufactured by Nippon Aerosil Co., Ltd., product name: AEROSIL (registered trademark) R9200). Otherwise, the photoreceptor 1 shown in FIG. 1 was obtained in the same manner as in Example 1.

Example 19

In the preparation of the charge transporting layer coating liquid, the dispersion process using the particle dispersing device was changed from a 6-pass process to a 1-pass process. Otherwise, the photoreceptor 1 shown in FIG. 1 was obtained in the same manner as in Example 1.

Example 20

In the preparation of the charge transporting layer coating liquid, tetrahydrofuran prepared in advance as follows was used instead of the 36 g of tetrahydrofuran. Otherwise, the photoreceptor 1 shown in FIG. 1 was obtained in the same manner as in Example 1.

To a 250 mL volume polypropylene container were added 2 mm diameter soda-lime glass beads (50 g) and 36 g of tetrahydrofuran, and the obtained mixture was stirred for 1 hour in a ball mill to obtain tetrahydrofuran containing abrasion powder of the glass beads in the tetrahydrofuran.

Comparative Example 1

In the preparation of the charge transporting layer coating liquid, the ball mill processing time was changed from 10 hours to 30 hours. Otherwise, the photoreceptor 1 shown in FIG. 1 was obtained in the same manner as in Example 2.

Comparative Example 2

In the preparation of the silica filler suspension of the charge transporting layer coating liquid, the 140 mL volume soda-lime glass container was changed to a 250 mL volume polypropylene container, the amount of silica particles was changed from 4 g to 10 g, the amount of tetrahydrofuran was changed from 36 g to 90 g, and the stirring time was changed from 15 hours to 45 hours. Further, with respect to the amounts added to the silica filler suspension, the amount of compound (1) which serves as the charge transporting substance was changed from 13.8 g to 11.5 g, the amount of polycarbonate was changed from 22.2 g to 18.5 g, and the amount of tetrahydrofuran was changed from 105.8 g to 51.8 g. Otherwise, the photoreceptor 1 shown in FIG. 1 was obtained in the same manner as in Example 1.

The above conditions are the same as in Example 7, except that a 250 mL volume polypropylene container was used.

Comparative Example 3

In the preparation of the silica filler suspension of the charge transporting layer coating liquid, in a 140 mL volume soda-lime glass container, 4 g of silica particles (number average primary particle size 12 nm, surface treated with dimethyldichlorosilane, manufactured by Nippon Aerosil Co., Ltd., product name: AEROSIL (registered trademark) R9200) were suspended in 36 g of tetrahydrofuran, and stirring was performed for 5 minutes with a stirrer (manufactured by Sibata Scientific Technology Co., Ltd., model: M-103) and a stirring blade. Otherwise, the photoreceptor 1 shown in FIG. 1 was obtained in the same manner as in Example 1.

Evaluation

The initial sensitivity, sensitivity stability, charging stability, and cleaning characteristics were evaluated by mounting the photoreceptors made in Examples 1 to 19 and Comparative Examples 1 and 2 on a unit in a digital copier (manufactured by Sharp Corporation, model: MX-B455W) remodeled for tests, and forming 300,000 images as follows.

Sensitivity Stability and Charging Stability

The photoreceptor surface potential of the developing portion, or more specifically the photoreceptor surface potential VL(−V) of a black background section upon exposure, was measured to observe the sensitivity. Then, in an environment with a temperature of 25° C. and a relative humidity of 10%, the process of charging, exposure, and static elimination was repeated one million times, and the initial residual potential and the photoreceptor surface potential after energization fatigue were measured. The difference between these values ΔVR(V) was used to evaluate the sensitivity stability based on the judgment standards below, and was used as an index of the sensitivity deterioration with repeated use.

Furthermore, the initial charge potential and the charge potential after energization fatigue were measured. The difference between these values ΔV0 was used to evaluate the charging stability based on the judgment standards below, and was used as an index of the charging deterioration.

Standards for Judging Sensitivity Stability

A: $\Delta VR(V)<40$

Can be used without problem even in high-speed multifunction peripherals or printers required to have high sensitivity B: $40\leq\Delta VR(V)<80$ Can be used without problem in low- or medium-speed multifunction peripherals or printers C: $80\leq\Delta VR(V)<140$ Density is slightly low but can be used without problem in low-speed and inexpensive multifunction peripherals or printers D: $140\leq\Delta VR(V)$ Problematic in actual use due to poor sensitivity and low density Standards for Judging Charging Stability A: $0\leq\Delta V0(-V)<60$ Very good, can be used without problem even in high-speed multifunction peripherals or printers required to have high sensitivity B: $60\leq\Delta V0(-V)<80$ Good, can be used without problem in low- or medium-speed multifunction peripherals or printers C: $80\leq\Delta V0(-V)<100$ Satisfactory, density is slightly low but can be used without problem in low-speed and inexpensive multifunction peripherals or printers D: $100\leq\Delta V0(-V)$ Unsatisfactory, problematic in actual use Cleaning Characteristics The cleaning blade of a cleaner provided in a digital multifunction peripheral was adjusted to have a contact pressure with the photoreceptor (cleaning blade pressure) of 21 gf/cm ($2.06\times10^{-1}$ N/cm: initial linear pressure). A printing durability test was performed by printing a lettering test chart (ISO19752) on 500,000 recording paper sheets under a normal temperature/normal humidity environment at a temperature of 25° C. and a relative humidity of 20%. In order to check the level of occurrence of cleaning defects on a photoreceptor after the printing durability test, the photoreceptor after forming 500,000 images was set on the test-use digital copier. Then, an untransferred image with 100% density was output on one A4 sheet, and immediately thereafter, the image forming device was forcibly stopped, and the surface of the photoreceptor was visually observed and the cleaning characteristics (degree of defect) were assessed on the basis of the following criteria.

Criteria

A: Cleaning defects do not occur

Can be used without problem even in multifunction peripherals or printers required to have high resolution B: Cleaning defects occur in 1 or 2 lines Can be used without problem except in multifunction peripherals or printers required to have high resolution C: Cleaning defects occur in 3 to 5 lines Can be used without problem in low-price multifunction peripherals or printers D: Cleaning defects occur in large number of lines Problematic in Actual Use Overall Evaluation On the basis of the judgment results of the evaluations described above, an overall evaluations of the photoreceptor was conducted in accordance with the following criteria.

A: All evaluations are A grade, very good

Can be used without problem even in multifunction peripherals or printers required to have extended life or high resolution B: Includes a B grade for any one of the judgments, but all evaluations are B grade or higher Can be used without problem except in multifunction peripherals or printers required to have extended life or high resolution C: Includes a C grade for any one of the judgements, but all evaluations are C grade or higher Can be used without problem in low-price multifunction peripherals or printers D: Includes grade D for any one of the judgments Not suitable for actual use Table 1 shows main constituent materials and physical properties of the prepared photoreceptors, and Table 2 shows results of the obtained measurements and evaluation results.

In Table 1, the silica particles and the materials of the charge transporting layer are listed with some abbreviations for the product names, where the resins "PC" and "PAR" respectively represent "polycarbonate resin" and "polyarylate resin", and for the layer forms, where "1" and "2" respectively represent "the photoreceptor does not have a surface protective layer, and the photoreceptive layer (charge transporting layer) contains silica particles", and "the photoreceptor has a surface protective layer containing silica particles, and the photoreceptive layer (charge transporting layer) does not contain silica particles".

Furthermore, the notation "AE-B" in the ratios of the contained elements Na and Ca represents "A×$10^{-B}$".

TABLE 1

| | Charge Transporting Layer | | | | | | | | | |
|---|---|---|---|---|---|---|---|---|---|---|
| | | Silica Particles | | | | Charge Transporting Substance | | Included Element and Ratio | |
| | Layer form | Material | Particle size (nm) | Content (mass %) | Resin Material | Material | IP (eV) | Na (ppm) | K (ppm) |
| Example 1 | 1 | R972 | 16 | 10 | PC | KND-1 | 5.47 | 1.5 | 0.02 |
| Example 2 | 1 | R972 | 16 | 21 | PC | KND-1 | 5.47 | 18 | 2.1 |
| Example 3 | 1 | R972 | 16 | 10 | PC | KND-1 | 5.47 | 19 | 5 |
| Example 4 | 1 | R972 | 16 | 10 | PC | KND-1 | 5.47 | 1.1 | 0.01 |
| Example 5 | 1 | RX50 | 40 | 10 | PC | KND-1 | 5.47 | 1.2 | 0.01 |
| Example 6 | 1 | R972 | 16 | 6.5 | PC | KND-1 | 5.47 | 1.1 | 0.01 |
| Example 7 | 1 | R972 | 16 | 25 | PC | KND-1 | 5.47 | 4.1 | 0.06 |
| Example 8 | 1 | R972 | 16 | 7 | PC | KND-1 | 5.47 | 19 | 5.1 |
| Example 9 | 1 | NX130 | 16 | 22 | PC | KND-1 | 5.47 | 16 | 4.1 |
| Example 10 | 1 | NX130 | 16 | 25 | PC | KND-1 | 5.47 | 18.8 | 5 |
| Example 11 | 1 | R972 | 16 | 6.5 | PAR | KND-1 | 5.47 | 1.5 | 0.02 |
| Example 12 | 1 | R972 | 16 | 10 | PC | 2MTPD | 5.51 | 1.5 | 0.02 |
| Example 13 | 1 | R972 | 16 | 10 | PC | CT-3 | 5.61 | 1.5 | 0.02 |
| Example 14 | 2 | R972 | 16 | 21 | PC | KND-1 | 5.47 | 18 | 2.1 |
| Example 15 | 1 | R972 | 16 | 10 | PC | KND-1 | 5.47 | 1.5 | 0.02 |
| Example 16 | 1 | R976 | 7 | 10 | PC | KND-1 | 5.47 | 1.8 | 0.03 |
| Example 17 | 1 | R974 | 12 | 10 | PC | KND-1 | 5.47 | 1.7 | 0.02 |
| Example 18 | | R9200 | 12 | 10 | PC | KND-1 | 5.47 | 2.1 | 0.04 |
| Example 19 | 1 | R9200 | 12 | 10 | PC | KND-1 | 5.47 | 2.1 | 0.04 |
| Example 20 | 1 | R972 | 16 | 10 | PC | KND-1 | 5.47 | 2.9 | 0.04 |
| Comparative Example 1 | 1 | R972 | 16 | 10 | PC | KND-1 | 5.47 | 42 | 7 |
| Comparative Example 2 | 1 | R972 | 16 | 25 | PC | KND-1 | 5.47 | 0 | 0 |
| Comparative Example 3 | 1 | R9200 | 16 | 25 | PC | KND-1 | 5.47 | 0.008 | 0 |

| | Charge Transporting Layer | | | | | |
|---|---|---|---|---|---|---|
| | Included Element and Ratio | | | | Surface | |
| | Na Ratio | Ca (ppm) | Mg (ppm) | Ca Ratio | Roughness Rz (μm) | Undercoat layer |
| Example 1 | 1.50E−05 | 0.01 | 0.01 | 1.00E−07 | 0.19 | Yes |
| Example 2 | 8.60E−05 | 11 | 7 | 5.20E−05 | 0.32 | Yes |
| Example 3 | 1.90E−04 | 11 | 10 | 1.10E−04 | 0.14 | Yes |
| Example 4 | 1.10E−05 | 0 | 0 | 0.00E+00 | 0.35 | Yes |

TABLE 1-continued

| | | | | | | |
|---|---|---|---|---|---|---|
| Example 5 | 1.20E−05 | 0.01 | 0.01 | 1.00E−07 | 0.31 | Yes |
| Example 6 | 1.70E−05 | 0.01 | ND* | 1.50E−07 | 0.18 | Yes |
| Example 7 | 1.60E−05 | 0.03 | 0.05 | 1.20E−07 | 0.43 | Yes |
| Example 8 | 2.70E−04 | 8.8 | 7.2 | 1.30E−04 | 0.09 | Yes |
| Example 9 | 7.30E−05 | 6.8 | 5.1 | 3.10E−05 | 0.58 | Yes |
| Example 10 | 7.50E−05 | 9.5 | 8 | 3.80E−05 | 0.62 | Yes |
| Example 11 | 2.30E−05 | 0.01 | 0.01 | 1.50E−07 | 0.19 | Yes |
| Example 12 | 1.50E−05 | 0.01 | 0.01 | 1.00E−07 | 0.19 | Yes |
| Example 13 | 1.50E−05 | 0.01 | 0.01 | 1.00E−07 | 0.19 | Yes |
| Example 14 | 8.60E−05 | 11 | 7 | 5.20E−05 | 0.16 | Yes |
| Example 15 | 1.50E−05 | 0.01 | 0.01 | 1.00E−07 | 0.19 | No |
| Example 16 | 1.80E−05 | 0.02 | 0.02 | 2.00E−07 | 0.09 | Yes |
| Example 17 | 1.70E−05 | 0.02 | 0.02 | 2.00E−07 | 0.12 | Yes |
| Example 18 | 2.10E−05 | 0.02 | 0.02 | 2.00E−07 | 0.95 | Yes |
| Example 19 | 2.10E−05 | 0.02 | 0.02 | 2.00E−07 | 1.08 | Yes |
| Example 20 | 2.90E−05 | 0.02 | 0.03 | 2.00E−07 | 0.1 | Yes |
| Comparative Example 1 | 4.20E−04 | 39 | 9 | 3.90E−04 | 0.15 | Yes |
| Comparative Example 2 | 0.00E+00 | 0 | 0 | 0.00E+00 | 0.66 | Yes |
| Comparative Example 3 | 3.20E−08 | 0 | 0 | 0.00E+00 | 0.66 | Yes |

*ND: Below detection limit

TABLE 2

| | Sensitivity Stability | | Charging Stability | | Cleaning | |
|---|---|---|---|---|---|---|
| | ΔVR (−V) | Result | $\Delta V_O$ (V) | Result | Characteristics Result | Overall Evaluation |
| Example 1 | 30 | A | 41 | A | A | A |
| Example 2 | 135 | C | 82 | C | B | C |
| Example 3 | 85 | C | 75 | B | A | B |
| Example 4 | 29 | A | 63 | B | C | C |
| Example 5 | 43 | B | 63 | B | B | B |
| Example 6 | 30 | A | 41 | A | B | B |
| Example 7 | 65 | B | 68 | B | B | B |
| Example 8 | 81 | C | 70 | B | B | C |
| Example 9 | 136 | C | 85 | C | B | C |
| Example 10 | 140 | C | 85 | C | C | C |
| Example 11 | 41 | B | 42 | A | A | B |
| Example 12 | 45 | B | 51 | B | A | B |
| Example 13 | 92 | C | 59 | B | A | C |
| Example 14 | 85 | C | 78 | C | B | C |
| Example 15 | 36 | A | 43 | A | A | A |
| Example 16 | 29 | A | 39 | A | B | B |
| Example 17 | 29 | A | 40 | A | A | A |
| Example 18 | 68 | B | 55 | B | C | C |
| Example 19 | 80 | C | 58 | B | C | C |
| Example 20 | 61 | B | 55 | B | A | B |
| Comparative Example 1 | 210 | D | 120 | C | A | D |
| Comparative Example 2 | 32 | A | 42 | A | D | D |
| Comparative Example 3 | 41 | B | 62 | B | D | D |

The results in Table 1 and Table 2 suggest the following.

(1) The photoreceptors of the present disclosure (Examples 1 to 20) which comprise a laminated photoreceptive layer, in which charge generating layer and a charge transporting layer are laminated in this order on a conductive base, wherein the charge transporting layer contains at least a charge transporting substance, a binder resin, and silica particles, and contains 0.1 ppm or more and 20 ppm or less of Na element and/or 0.01 ppm or more and 10 ppm or less of K element, have excellent printing durability, high mechanical strength, and do not cause image defects due to partial breakage of the cleaning blade or unevenness in image shading due to wear variation. On the other hand, a photoreceptor in which the charge transporting layer contains more than the amount of Na element and K element prescribed by the present disclosure (Comparative Example 1) has a small ten-point surface roughness Rz of the laminated photoreceptive layer surface, and it is thought that the silica is uniformly dispersed in the laminated photoreceptive layer such that problems such as cleaning defects with repeated use do not occur. However, because a large amount of the Na element and the K element is present, the sensitivity stability and the charging stability and the like are unstable, and stable electrophotographic characteristics cannot be maintained over a long period of time. Furthermore, a photoreceptor in which there is no contact with soda-lime glass in the preparation step of the charge transporting layer coating liquid and the charge transporting layer does not contain Na element and K element (Comparative Example 2), has a large ten-point surface roughness Rz due to insufficient crushing of the silica in the laminated photoreceptive layer. This causes breakages of the cleaning blade with repeated use, which results in cleaning defects and image scratches, and the image quality cannot be maintained over a long period of time.

(2) In the preparation step of the charge transporting layer coating liquid and the second charge transporting layer coating liquid, when soda-lime glass equipment having sodium oxide or potassium oxide, and calcium oxide or magnesium oxide as constituents is used, contact with the glass material often results in Ca element and Mg element in the charge transporting layer and the second charge transporting layer coating liquid to be included in conjunction with Na element and K element. When the content of Ca element and Mg element respectively exceed 10 ppm and 8 ppm, the sensitivity stability and the charging stability become somewhat unstable with repeated use in a similar manner to (1) above (Example 3). On the other hand, when the content of Ca element and Mg element is zero or is low, the crushing of the silica in the laminated photoreceptive layer becomes insufficient, the ten-point surface roughness Rz becomes large, and the load on the cleaning blade with repeated use becomes large. Furthermore, by adjusting the ratio (Na/SF) of the content of Na element to the content of silica particles to $8\times10^{-6}$ or more and $2\times10^{-5}$ or less, and the ratio (Ca/SF) of the content of Ca element to the content of silica particles to $1\times10^{-7}$ or more and $1\times10^{-6}$ or less, the sensitivity stability, charging stability, and cleaning characteristics are all achieved (Examples 1, 4, and 6).

(3) When the number average primary particle size of the silica particles exceeds 30 μm, even when the coating liquid makes contact with the soda-lime glass in the preparation step, the larger particle size of the silica causes the ten-point surface roughness Rz to become somewhat larger and the silica agglomerates in the laminated photoreceptive layer to become larger, resulting in a tendency of the load on the cleaning blade to become larger with repeated use (Example 5).

On the other hand, when the number average primary particle size of the silica particles is less than 10 μm, the ten-point surface roughness Rz becomes too small, which increases the contact area between the laminated photoreceptor surface and the cleaning blade, which conversely results in a tendency of the load on the cleaning blade to become larger (Example 16). Furthermore, the higher the silica content in the charge transporting layer and the second charge transporting layer, the more the printing durability improves. However, the ten-point surface roughness Rz becomes larger, and the load on the cleaning blade becomes larger (Example 7). The lower the silica content, the more the strength of the surface layer decreases, resulting in a tendency for image scratches and the like to more easily occur (Example 6).

(4) In the preparation step of the charge transporting layer coating liquid and the second charge transporting layer coating liquid, when the contact frequency with the soda-lime glass equipment increases, the amount of the contained elements becoming mixed increases. This causes the crushing of the silica to proceed, which lowers the ten-point surface roughness Rz and enables the load on the cleaning blade to be reduced. However, the amount of the contained elements becoming mixed increases, resulting in a tendency for the sensitivity stability and the charging stability to become unstable with repeated use (Example 8).

Moreover, when the ten-point surface roughness Rz of the charge transporting layer increases, the load on the cleaning blade increases. This can be used without problem in the case of a low-cost multifunction peripheral or printer, but there is a high probability that the life of the photoreceptor will be reduced (Examples 9, 10, 18 and 19).

(5) The photoreceptors using a resin having a polyarylate skeleton as the binder resin of the charge transporting layer are capable of suppressing the degradation of the photoreceptor surface with repeated use more than a photoreceptor using a polycarbonate resin, which reduces the load on the cleaning blade. However, this results in a tendency for the sensitivity stability to become somewhat inferior with repeated use (see Examples 6 and 11).

(6) The sensitivity stability with repeated use is better when the ionization potential of the charge transporting substance is 5.55 eV or less, and in particular, when the charge transporting substance is compound 1 (stilbene derivative), stable sensitivity characteristics can be maintained over a long period of time (see Examples 1, 12 and 13).

On the other hand, when the ionization potential is less than 5.4 eV, there is a significant effect of chemical degradation caused by the oxidative gases generated in the actual machine, which increases the risk of image defects and makes it necessary to provide considerations on the machine side such as providing a discharge mechanism of the oxidative gases in the actual machine. Therefore, the optimal ionization potential of the charge transporting substance is 5.4 eV or more and 5.55 eV or less.

(7) It is possible to increase the charging stability with repeated use by providing an undercoat layer between the conductive base and the laminated photoreceptive layer (see Examples 1 and 15).

What is claimed is:

1. An electrophotographic photoreceptor comprising at least a laminated photoreceptive layer, in which a charge generating layer and a charge transporting layer are laminated in this order on a conductive base, wherein the charge transporting layer contains at least a charge transporting substance, a binder resin, and silica particles, and contains 0.1 ppm or more and 4.1 ppm or less of Na element and 0.01 ppm or more and 0.06 ppm or less of K element, each of the Na element and the K element being abrasion powder derived from a soda-lime glass material.

2. The electrophotographic photoreceptor according to claim 1, wherein the charge transporting layer further contains 0.01 ppm or more and 10 ppm or less of Ca element and 0.01 ppm or more and 8 ppm or less of Mg element.

3. The electrophotographic photoreceptor according to claim 1, wherein the silica particles have a number average primary particle size of 10 nm or more and 30 nm or less, and a content of the silica particles is 7% by mass or more and 25% by mass or less of the charge transporting layer.

4. The electrophotographic photoreceptor according to claim 1, wherein a mass ratio [Na/SF] of a content of the Na element [Na] to a content of the silica particles [SF] in the charge transporting layer is $8\times10^{6}$ or more and $2\times10^{-5}$ or less.

5. The electrophotographic photoreceptor according to claim 2, wherein a mass ratio [Ca/SF] of a content of the Ca element [Ca] to a content of the silica particles [SF] in the charge transporting layer is $1\times10^{-7}$ or more and $1\times10^{-6}$ or less.

6. The electrophotographic photoreceptor according to claim 1, wherein the charge transporting substance has an ionization potential of 5.4 eV or more and 5.55 eV or less.

7. The electrophotographic photoreceptor according to claim 1, wherein the charge transporting substance is a stilbene derivative represented by a general formula (I):

(I)

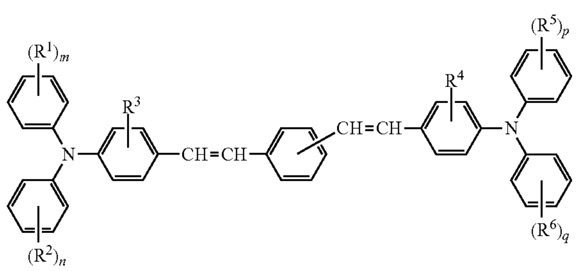

wherein $R^1$, $R^2$, $R^5$, and $R^6$ are identically or independently an alkyl group, an alkoxy group, an aryl group, an aralkyl group, or a halogen group; m, n, p, and q are identically or independently an integer of 0 to 3; and $R^3$ and $R^4$ are identically or independently a hydrogen atom or an alkyl group.

8. The electrophotographic photoreceptor according to claim 1, wherein the charge transporting layer has a ten-point surface roughness of 0.1 μm or more and 1.0 μm or less, as defined by JIS-B-0601 (1994).

9. The electrophotographic photoreceptor according to claim 1, wherein the binder resin is a resin having a polycarbonate Z-skeleton or a polyarylate skeleton.

10. The electrophotographic photoreceptor according to claim 1, wherein the charge transporting layer comprises a first charge transporting layer and a second charge transporting layer laminated in this order on the charge generating layer, the first charge transporting layer comprises the charge transporting substance and the binder resin, and the second charge transporting layer comprises the charge transporting substance, the binder resin, and the silica particles.

11. The electrophotographic photoreceptor according to claim 1, further comprising an undercoat layer between the conductive base and the laminated photoreceptive layer.

12. An image forming device at least comprising, at least:

the electrophotographic photoreceptor according to claim 1;

a charger that charges the electrophotographic photoreceptor;

an exposer that exposes the charged electrophotographic photoreceptor to form an electrostatic latent image;

a developer that develops the electrostatic latent image formed by the exposure to form a toner image;

a transferer that transfers the toner image formed by the developer onto a recording medium;

a fuser that fuses the transferred toner image on the recording medium to form an image;

a cleaner that removes and recovers toner remaining on the electrophotographic photoreceptor; and a charge eliminator that eliminates surface charges remaining on the electrophotographic photoreceptor.

13. A method of producing the electrophotographic photoreceptor according to claim 1, the method including:

forming the charge transporting layer by using a charge transporting layer coating liquid containing at least the charge transporting substance, the binder resin, and the silica particles, and containing 0.1 ppm or more and 4.1 ppm or less of the Na element and 0.01 ppm or more and 0.06 ppm or less of the K element with respect to a solid content, each of the Na element and the K element being abrasion powder derived from the soda-lime glass material.

* * * * *